(12) United States Patent
Chen et al.

(10) Patent No.: US 10,684,725 B1
(45) Date of Patent: Jun. 16, 2020

(54) TOUCH INPUT HOVER

(71) Applicant: Microsoft Technology Licensing, LLC, Redmond, WA (US)

(72) Inventors: Jessica Chen, Redmond, WA (US); Jonathan Marc Holley, Seattle, WA (US); Christopher Court, Woodinville, WA (US); Taylor Jordan Hartman, Seattle, WA (US); Adam Samuel Riddle, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/278,307

(22) Filed: Feb. 18, 2019

Related U.S. Application Data

(60) Provisional application No. 62/800,130, filed on Feb. 1, 2019.

(51) Int. Cl.
*G06F 3/041* (2006.01)
(52) U.S. Cl.
CPC .. *G06F 3/0416* (2013.01); *G06F 2203/04101* (2013.01)

(58) Field of Classification Search
CPC .. G06K 9/00389; G06K 9/222; G06F 3/0416; G06F 3/0412; G06F 2203/04101; H04M 2250/22
See application file for complete search history.

(56) References Cited

U.S. PATENT DOCUMENTS

2011/0157028 A1* 6/2011 Stallings ............. G06F 3/04883
345/173
2013/0342480 A1* 12/2013 Moon ................... G06F 3/0488
345/173

* cited by examiner

*Primary Examiner* — Abbas I Abdulselam
(74) *Attorney, Agent, or Firm* — Christopher J. Volkmann; Kelly, Holt & Christenson, PLLC

(57) ABSTRACT

An input mode trigger is detected so that a computing system treats inputs from a touch sensing device as touch inputs. A focus area input mechanism, which is smaller than a display screen controlled by the computing system, is displayed on the display screen. A hover mode touch input is detected, and a touch input on the touch sensing device is mirrored by corresponding movement of visual indicia on the focus area input mechanism on the display screen. Other touch gestures are used to perform operations within the focus area input mechanism.

20 Claims, 24 Drawing Sheets

TOUCH INPUT HOVER

CROSS-REFERENCE TO RELATED APPLICATION

The present application is based on and claims the benefit of U.S. provisional patent application Ser. No. 62/800,130, filed Feb. 1, 2019, the content of which is hereby incorporated by reference in its entirety.

BACKGROUND

Computing systems are currently in wide use. Some computing systems are coupled to display devices that are not touch sensitive display devices. For instance, a computing system can be coupled to a monitor, a television set, or other display device that is not touch sensitive. Similarly, other computing systems, such as tablets and laptop computing devices may have display screens that are not touch sensitive.

In these scenarios, some touch experiences are very difficult to simulate. For instance, where a user wishes to ink (or draw on) a document, some such systems allow the user to enter a drawing mode and then press and hold a mouse button, and then to move the mouse, in an attempt to draw on the visually displayed content.

The discussion above is merely provided for general background information and is not intended to be used as an aid in determining the scope of the claimed subject matter.

SUMMARY

An input mode trigger is detected so that a computing system treats inputs from a touch sensing device as touch inputs. A focus area input mechanism, which is smaller than a display screen controlled by the computing system, is displayed on the display screen. A hover mode touch input is detected, and a touch input on the touch sensing device is mirrored by corresponding movement of visual indicia on the focus area input mechanism on the display screen. Other touch gestures are used to perform operations within the focus area input mechanism.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
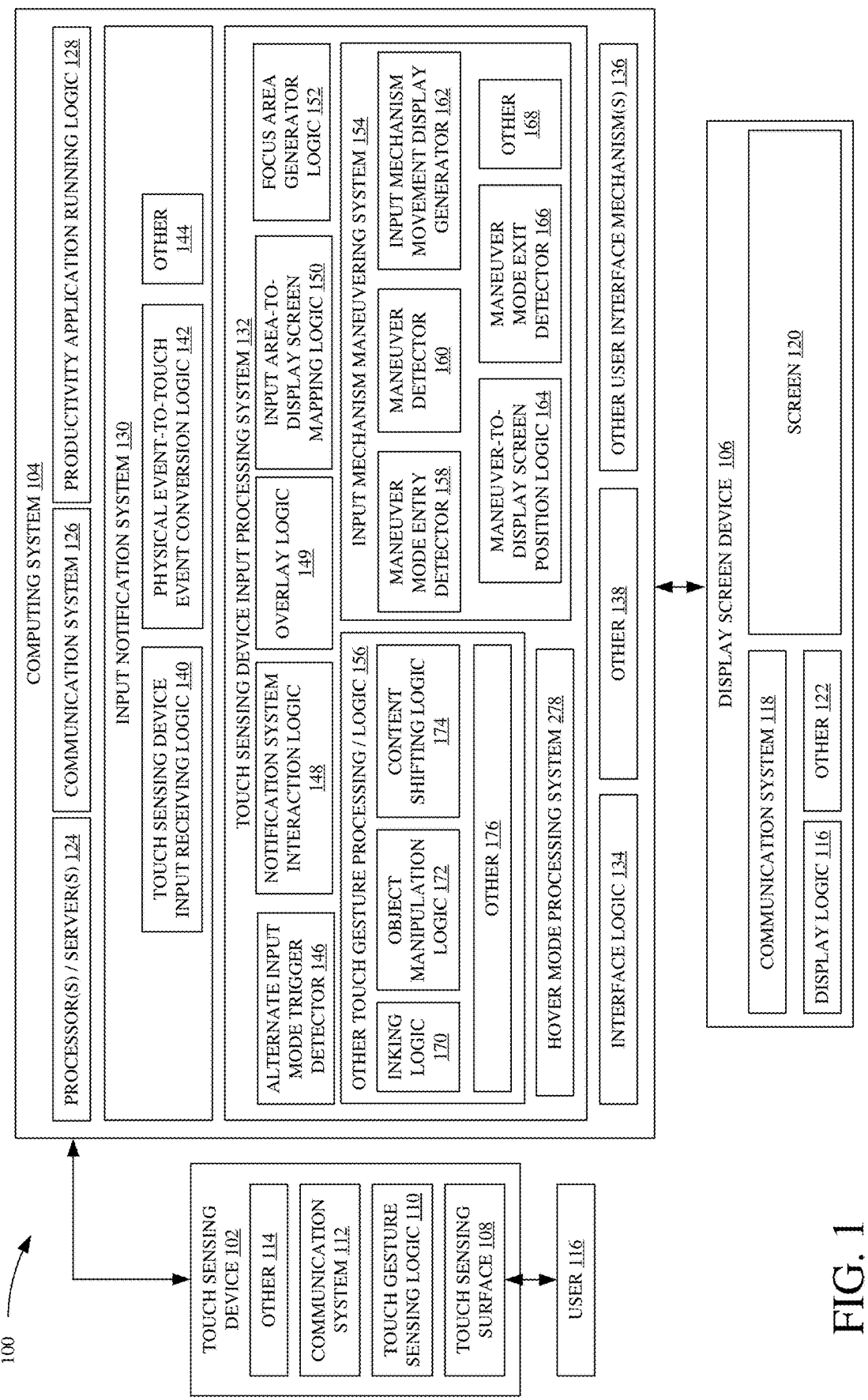
FIG. 1 is a block diagram of one example computing system architecture.

FIG. 1 is a block diagram of one example of a computing system architecture 100. Architecture 100, in the example shown in FIG. 1, includes a touch sensing device 102, a computing system 104 and a display screen device 106. It will be noted that the touch sensing device 102 and/or display screen device 106 can be integrated within computing system 104, but they are shown as being separate for the sake of example only.

Touch sensing device 102 illustratively includes a touch sensing surface 108, touch gesture sensing logic 110, communication system 112, and it can include other items 114. FIG. 1 shows that user 116 can interact with touch sensing surface 108 on device 102 in order to control and manipulate device 102 and portions of computing system 104 and display screen device 106. Touch sensing surface 108 can be a touch sensitive display screen on a smart phone, a touch sensitive screen on a tablet, a track pad that is attached to computing system 104, or another device that includes a touch sensing surface.

Touch gesture sensing logic 110 illustratively senses user touch inputs on touch sensing surface 108 and generates an indication that those interactions or inputs that have been detected. Communication system 112 illustratively communicates the output from touch gesture sensing logic 110 to computing system 104.

Display screen device 106 illustratively includes display logic 116, communication system 118, display screen 120, and it can include a wide variety of other items 122. Display logic 116 illustratively generates outputs that can be used to display information on screen 120. Communication system 118 illustratively communicates with computing system 104 to receive instructions that are provided to display logic 116 for displaying items on screen 120. In one example, screen 120 is larger than touch sensing surface 108. For instance, display screen device 104 can be a television, a desktop monitor, another type of large screen device, or a monitor on a notebook computer or desktop computer that has an attached track pad which forms touch sensing device 102. All of these and other examples are contemplated herein. In any case, screen 120 has a larger display surface than the touch sensitive area of touch sensing surface 108.

In accordance with one example, computing system 104 receives touch inputs from touch sensing device 102 and uses those to display elements on screen 120. Thus, it enables user 116 to use touch sensing surface 108 to mimic a touch screen experience so that the user can provide touch gestures on touch sensing surface 108, and they are used to modify the content being displayed on screen 120. In one example, user 116 can use a light touch input to draw on the content being shown on screen 120, or to otherwise perform operations. In this way, the user need not exert extra force on touch sensing surface 108 when making motions that are used in operations such as inking on the screen, or other operations.

Also, in one example, computing system 104 generates a focus area input mechanism on screen 120, that is smaller than screen 120. The focus area input mechanism on screen 120 corresponds to the touch sensing surface 108. Therefore, when the user provides a touch input to perform an operation on touch sensing surface 108, that operation is performed within the focus area input mechanism on screen 120.

In addition, the user can provide a maneuver input so that the focus area input mechanism can be moved about on screen 120. When the user maneuvers the focus area input mechanism to a desired location, the user can then provide touch inputs that are used to perform operations within that area, which are also used to modify the content being displayed, and over which the focus area input mechanism is overlaid. This is described in greater detail below.

Before describing computing system 104, and its operation, in more detail, a brief description of some of the items in computing system 104, and their operation, will first be provided. In one example, computing system 104 illustratively includes processors or servers 124, communication system 126, productivity application running logic 128, input notification system 130, touch sensing device input processing system 132, interface logic 134, other user interface mechanisms 136, and it can include a wide variety of other items 138. Communication system 126 illustratively allows computing system 104 to communicate with touch sensing device 102 and display screen device 106. It can also allow computing system 104 to communicate over a network (such as a wide area network, a local area network, a near field communication network, a cellular communication network or other networks or combinations of networks) with a remote computing system. The remote computing system may be a cloud computing system or another remote server architecture, or another remote system.

Productivity application running logic 128 illustratively runs one or more different productivity applications. Those applications can be used to generate content or documents and may include such things are a slide presentation application, a spreadsheet application, a word processing application, or any of a wide variety of other applications.

Input notification system 130 illustratively includes touch sensing device input receiving logic 140, physical event-to-touch event conversion logic 142, and it can include a wide variety of other items 144. Touch sensing device input receiving logic 140 illustratively receives inputs from touch sensing device 102 indicating the types of physical events that the user has initiated on touch sensing device 102. For instance, it can receive inputs indicating the different types of touch gestures the user has input through touch sensing surface 108, or other physical events.

Physical event-to-touch event conversion logic 142 converts those events, when configured to do so, into touch events. For instance, it can be configured to convert all physical interactions of user 116 with touch sensing surface 108 into touch gestures. Thus, it can interpret the events as taps, swipes, pinches, or any of a wide variety of touch gestures input by user 116 on touch sensing surface 108.

Interface logic 134 illustratively generates outputs for display screen device 106 and other user interface mechanisms 136. It can also detect user interaction through those interface mechanisms. The interface mechanisms can include visual mechanisms, such as display screen device 106, or other display devices. They can include haptic devices, audio devices, or other interface mechanisms. Where a computing system 104 is configured to use speech recognition functionality, then the user interface mechanisms can include a microphone, a speaker, or other devices for receiving and outputting audio information. Similarly, the user interface mechanisms can include icons, links, buttons, joysticks, or a wide variety of other user interface mechanisms. In one example, user 106 can provide an input to enter an alternate input mode so that the user inputs through touch sensing surface 108 are to be used by computing system 104 as touch inputs and displayed on screen 120. Touch sensing device input processing system 132 detects this input by user 116 and configures input notification system 130 to treat all of the physical events received through touch sensing surface 108 as touch inputs and to generate a signal indicative of those events.

Therefore, touch sensing device input processing system 132 can include alternate input mode trigger detector 146, notification system interaction logic 148, overlay logic 149, input area-to-display screen mapping logic 150, focus area generator logic 152, input mechanism maneuvering system 154, hover mode processing system 278, and other touch gesture processing logic 156. Input mechanism maneuvering system 154 illustratively includes maneuver mode enter detector 158, maneuver detector 160, input mechanism movement display generator 162, maneuver-to-display screen position logic 164, maneuver mode exit detector 166, and it can include other items 168. Other touch gesture processing logic 156 can include inking logic 170, object manipulation logic 172, content shifting logic 174, and it can include other items 176.

Alternate input mode trigger detector 146 detects an input from user 116 indicating that the user 116 wishes computing system 104 to receive touch inputs through touch sensing device 102. Notification system interaction logic 148 then controls input notification system 130 so that it configures touch sensing device input receiving logic 140 to receive the inputs from touch sensing device 102 and physical event-to-touch event conversion logic 142 to consider all of those events as touch events and generate an output indicative of a touch event represented by the input from touch sensing device 102.

Input area-to-display screen mapping logic illustratively identifies a location on display screen 120 where the focus area input mechanism is to be displayed. Focus area generator logic 152 generates a representation of the focus area input mechanism and displays it on display screen 120 over the canvas that is already displaying content. Overlay logic 149 generates a representation of the visual qualities of the focus area. Input mechanism (such as its outline color, the ordering of outline colors, its shadow color, the overlay color, etc.). This is described in greater detail below. Overlay logic 149 generates a representation of the visual qualities of the focus area input mechanism (such as its outline color, the ordering of outline colors, shadow color, overlay color, etc.). This is described in greater detail below. As long as user 116 is happy with the position of the focus area input mechanism, and does not wish to move it on screen 120, other touch gesture processing logic 156 receives touch gestures from touch sensing surface 108 and processes those within the focus area input mechanism. For instance, it may receive an input indicating that user 116 wishes to draw (or ink) within the focus area input mechanism. In that case, inking logic 170 generates an inking display that writes or draws within the focus area input mechanism at a position corresponding to where the user is tracing his or her finger, using a light touch, on touch sensing surface 108. It illustratively mirrors the movement of the user's finger on touch sensing surface 108, within the focus area input mechanism on screen 120.

Figure 4A:
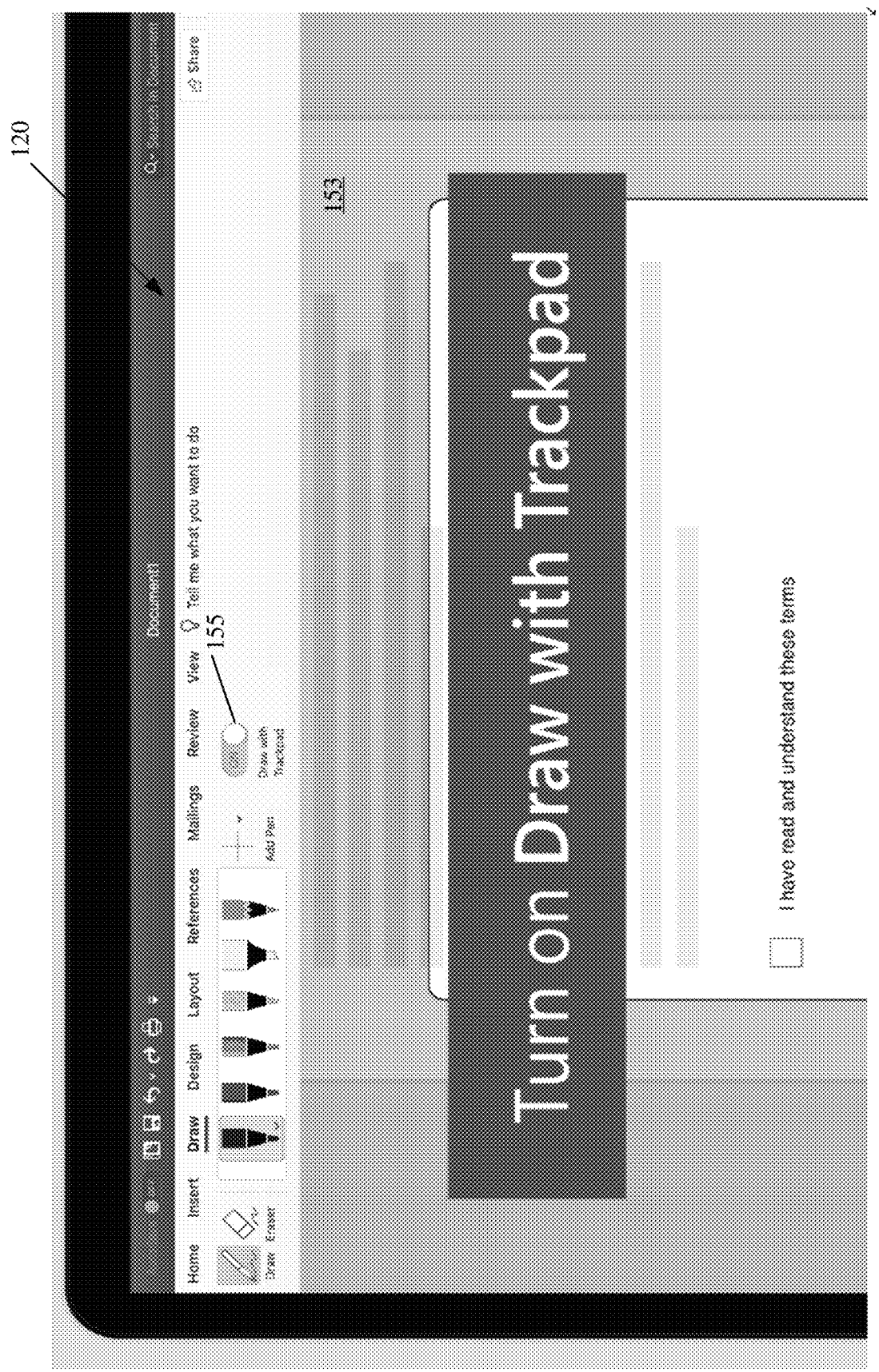
FIGS. 4A, 4B, 4C, 4D, 4E, 4F, 4G, 4H, 4I, 4J, 4K and 4L show different examples of user interface displays and combinations of user interface displays with track pad interactions.

An example may be helpful. FIG. 4A shows a display screen 120 that is displaying content on a canvas 153. FIG. 4A also shows a drawing actuator 155 that can be actuated (e.g., using a point and click device or otherwise) to turn on an alternative input mode so user 116 can use touch sensing device 102 to provide touch inputs to modify the content on canvas 153. FIG. 4A shows that the user has actuated actuator 155 to enable the alternative input mode.

Figure 4B:
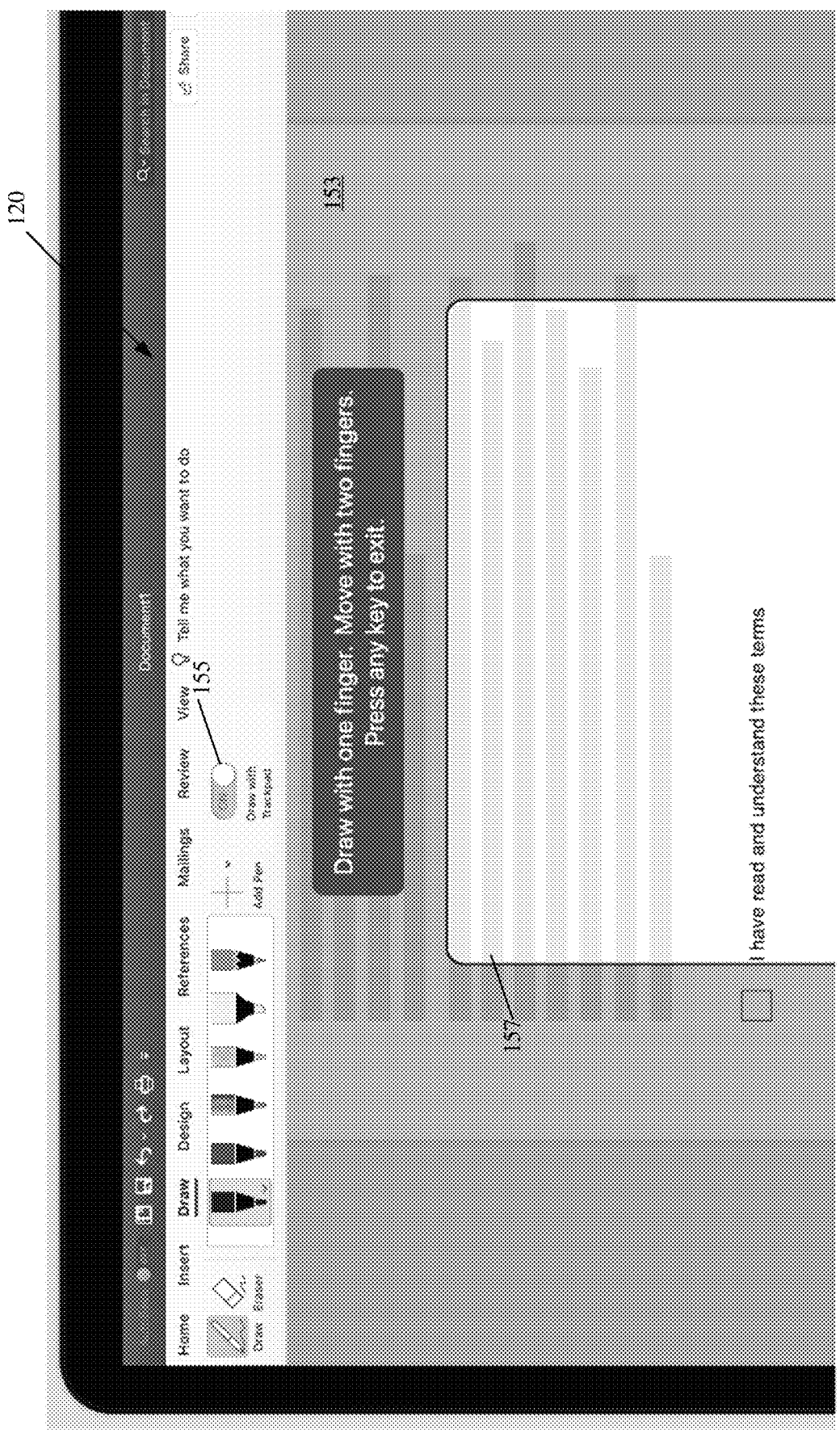

In response, FIG. 4B shows that a focus area input mechanism 157 is now displayed on canvas 153. Mechanism 157 corresponds to the touch sensing surface 108. Therefore, touch inputs on touch sensing surface 108 are shown on focus area input mechanism 157. The color, outline color, shadow color, overlay color, etc., are determined by overlay logic 149 and this can be done by identifying the overall brightness of the document content on canvas 153 and choosing colors to enhance contrast and readability. An example of this is shown below with respect to FIGS. 4F and 4G.

Figure 4C:
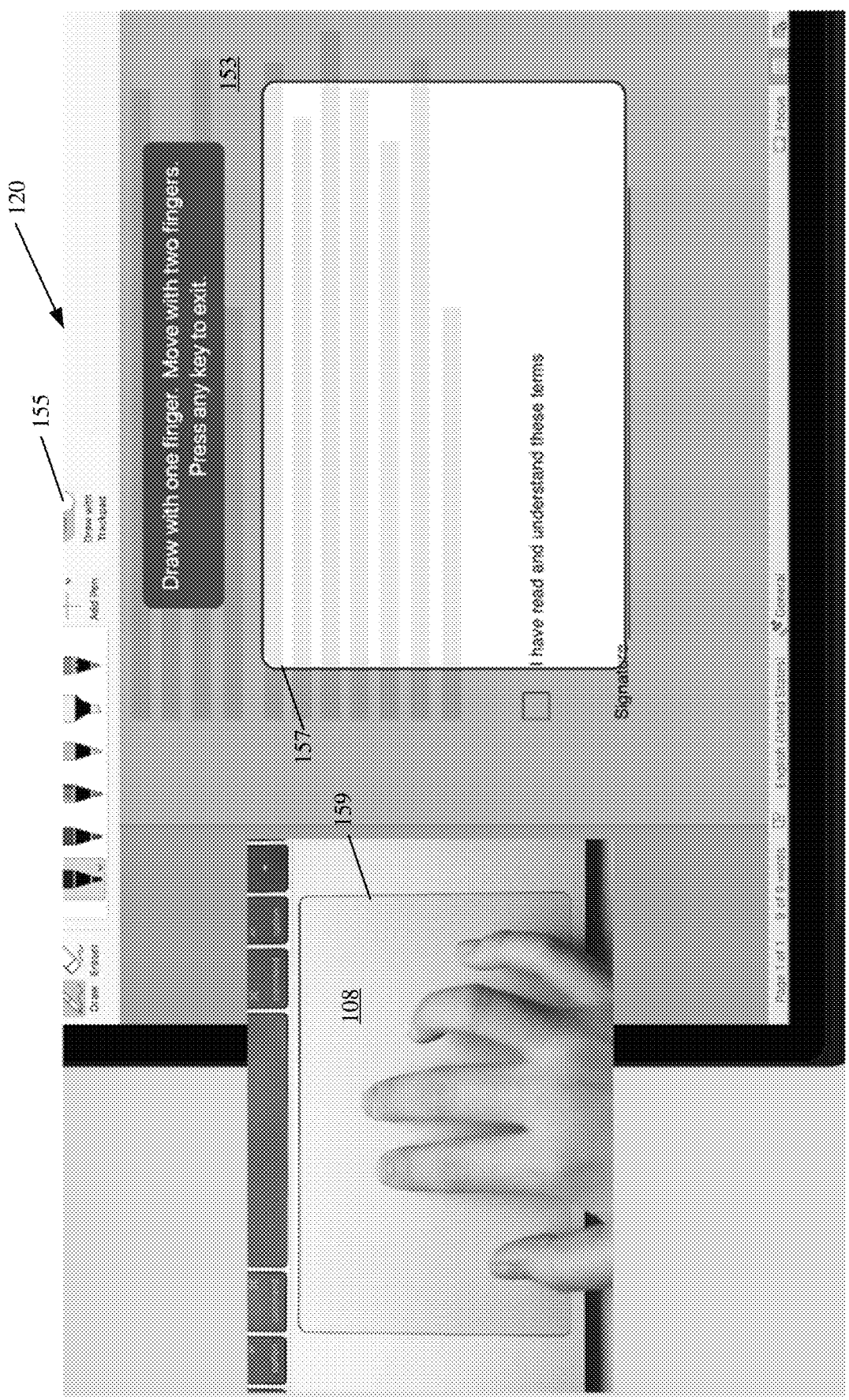

FIG. 4C shows an example in which touch sensing device 102 has a touch sensing surface 108 corresponding to a trackpad 159. Thus, the result of touch gestures on trackpad 159 will be displayed within focus area input mechanism 157 on screen 120, and they can be used to directly affect the underlying content on canvas 153 (as opposed, for instance, to cutting and pasting from mechanism 157 onto canvas 153). Object manipulation logic 172 detects touch inputs that are used to manipulate objects (such as actuate links or other actuators, move objects, etc.) on the content). Content shifting logic 174 detects user touch inputs that are used to shift content being displayed on screen 120 (such as panning, scrolling, etc.).

However, it may be that the user 116 wishes to change the location of the focus area input mechanism 157 on screen 120. For instance, as shown in FIG. 4C, the focus area input mechanism may not be positioned properly for the user to use touch gestures to sign on the signature line and check the checkbox. In that case, maneuver mode entry detector 158 detects a user input indicating this. For instance, instead of touching the touch sensing surface 108 with one finger, the user may touch it with two fingers, and this may be detected by maneuver mode entry detector 158 as an indication that the user 116 wishes to move the focus area input mechanism. One example of this is shown in FIG. 4D.

In response, maneuver detector 160 detects a maneuver input indicating where the user wishes to move the focus area input mechanism. For instance, it may be that user 116 drags both fingers up, down, or in any other direction, across touch sensing surface 108. In that case, maneuver detector 160 indicates this to input mechanism movement display generator 162 which generates an indication, that can be displayed on screen 120, of the focus area input mechanism 157 moving across the screen in the indicated direction. Maneuver-to-display screen position logic 164 detects the new position of the focus area input mechanism 157 based on its old position, and based on the maneuver input provided by user 116. The user 116 can continue to move the focus area input mechanism 157 around the display screen 120 until user 116 is satisfied with its position. At that point, the user 116 provides another input indicating that the user wishes to exit the maneuver mode and again begin entering content through the focus area input mechanism, using touch gestures on touch sensing surface 108. In that case, maneuver mode exit detector 166 detects that the user wishes to exit that mode, and system 132 again allows user 116 to enter content on the underlying document (displayed on canvas 153) being displayed on screen 120, through the focus area input mechanism 157, using touch gestures on touch sensing surface 108.

Figure 4D:
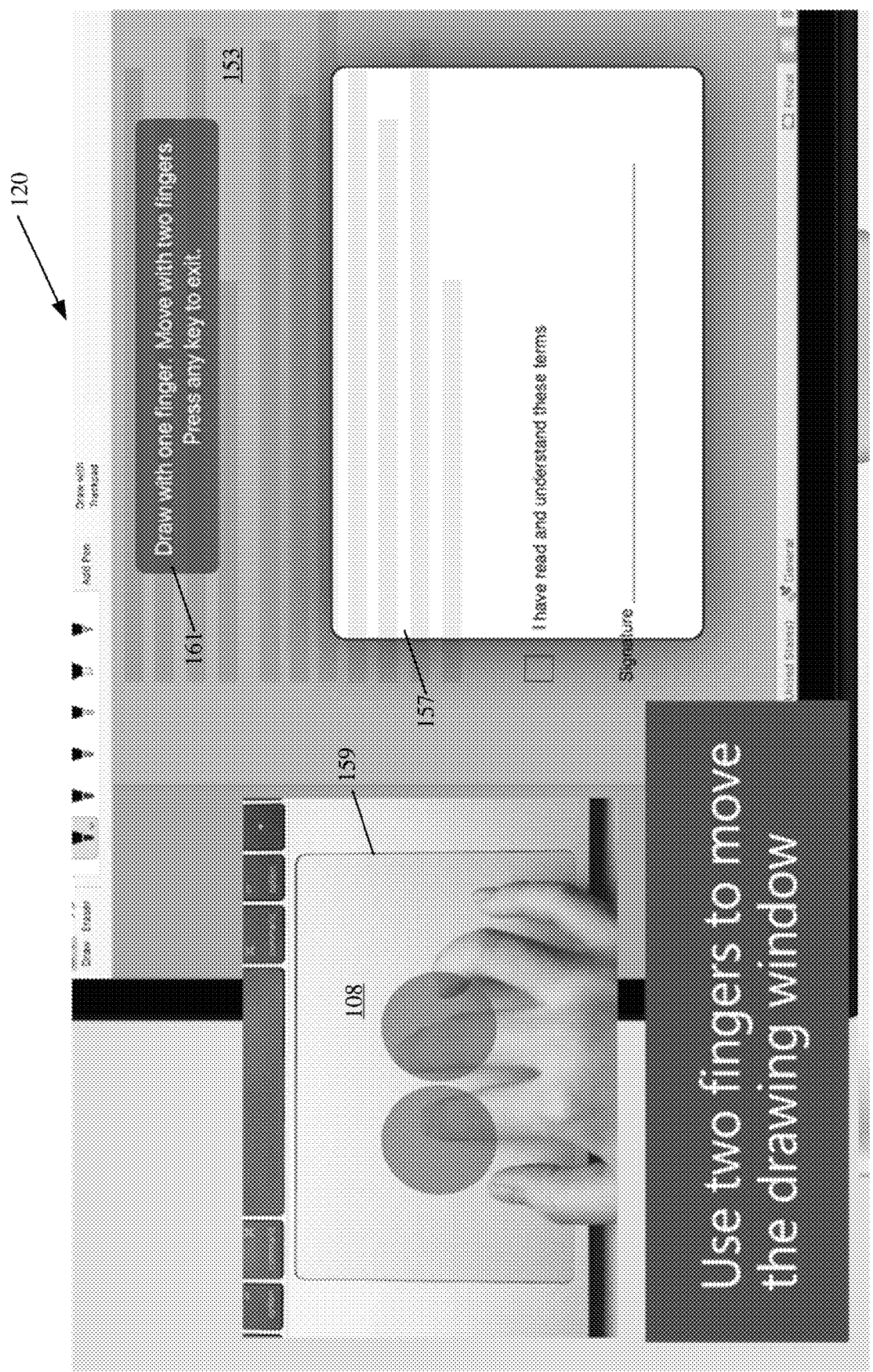
Figure 4E:
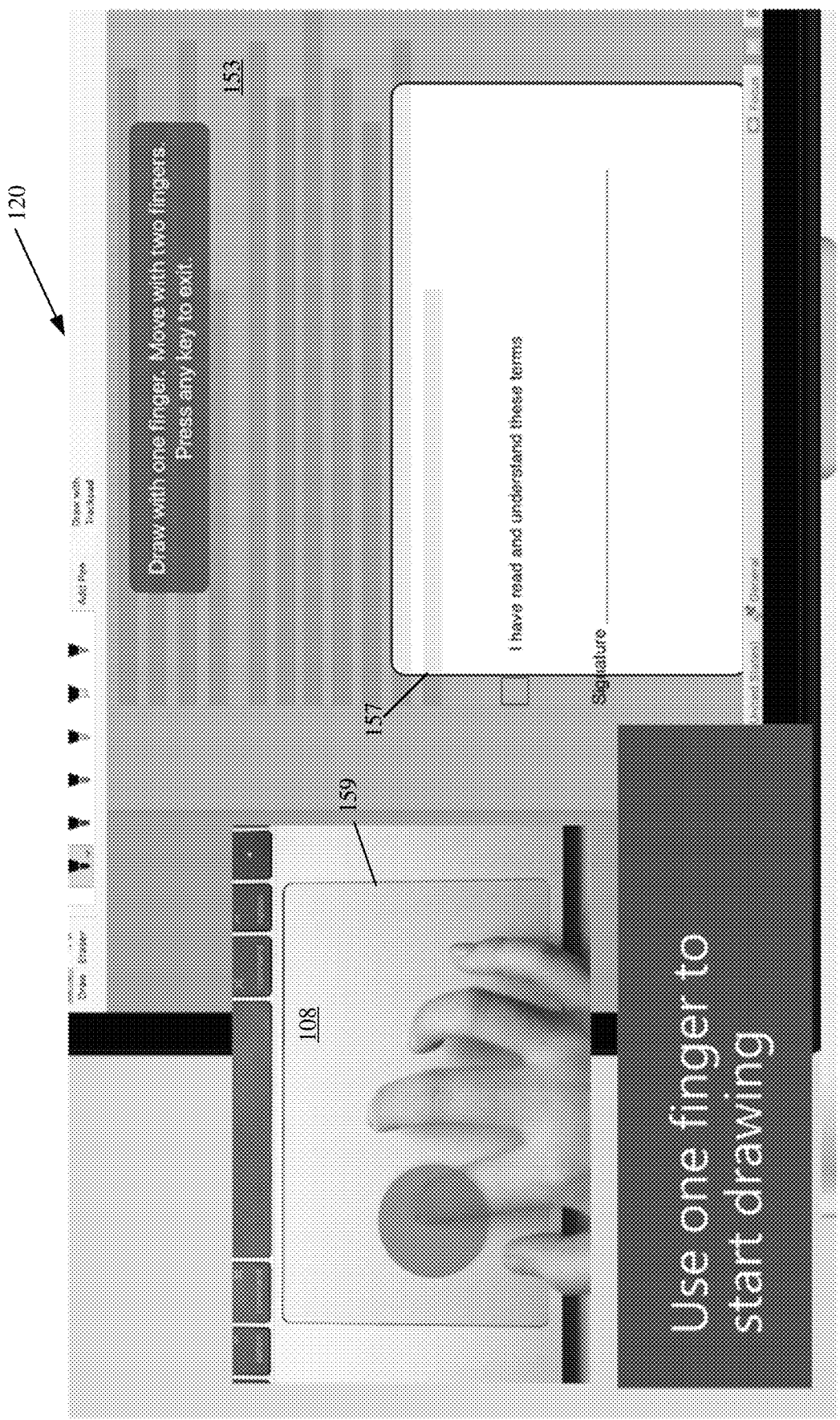

As an example, FIG. 4D shows that the user has moved his or her fingers downward on surface 108 so mechanism 157 encompasses the signature line on the content displayed on canvas 153. When the user exists the maneuver mode (such as by lifting one finger off the surface 108), the user can then begin inputting content with touch gestures. An example of this is shown in FIG. 4E where the user is beginning to sign on the signature line.

Figure 2:
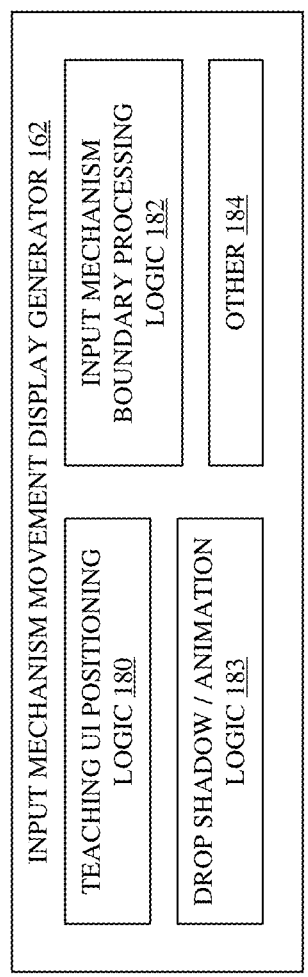
FIG. 2 is a block diagram showing one example of an input mechanism movement display generator, in more detail.

FIG. 2 is a block diagram showing one example of the input mechanism movement display generator 162, in more detail. In the example shown in FIG. 2, generator 162 illustratively includes teaching user interface (UI) positioning logic 180, input mechanism boundary processing logic 182, and it can include other items 184. In one example, while the user is in the alternate input mode, a teaching UI (such as UI 161 in FIG. 4D) may be displayed on the underlying content canvas 153 which indicates how the user may enter and exit various different modes. In that scenario, teaching UI position logic 180 keeps track of the position of the focus area input mechanism 157 on display screen 120, as user 116 is moving it or maneuvering around that screen. It also keeps track of the current position of the teaching UI 161 displayed on screen 120. When a boundary of the focus area input mechanism 157 is within a threshold distance, on screen 120, of a boundary of teaching UI 161, then logic 180 shifts the position of the teaching UI 161, so that it is not obscured by the focus area input mechanism 157, or so that it does not obscure a part of the focus area input mechanism 157. In doing so, logic 180 can track the boundaries of both the teaching UI 161 that is displayed on screen 120, and the boundaries of the focus area input mechanism 157. When they are about to collide, or when they are within a predetermined threshold distance of one another (or a dynamically varying threshold), then logic 180 will move the teaching UI 161 to a different position. For instance, when the user is moving the focus area input mechanism 157 upward on screen 120, logic 180 may reposition the teaching UI 161 so that it is below the focus area input mechanism 157 on screen 120. This may avoid having to continually move the teaching UI 161 in response to continued movement of the focus area input mechanism 157. This is just one example.

Input mechanism boundary processing logic 182 also respects the boundaries of the focus area input mechanism 157, and the content being displayed on canvas 153 on screen 120. Therefore, if the user attempts to move the focus area input mechanism 157 off of screen 120 to one side or the other (or off of the underlying content canvas 153), then this will be visually indicated, somehow, by logic 182. In one example, it will simply stop moving the focus area input mechanism 157 when its boundary reaches the boundary of screen 120 or the underlying content canvas 153. In another example, it may use bouncing or other animations to indicate that the user is attempting to move the focus area input mechanism 157 off screen (or off of the canvas).

Figure 2A:
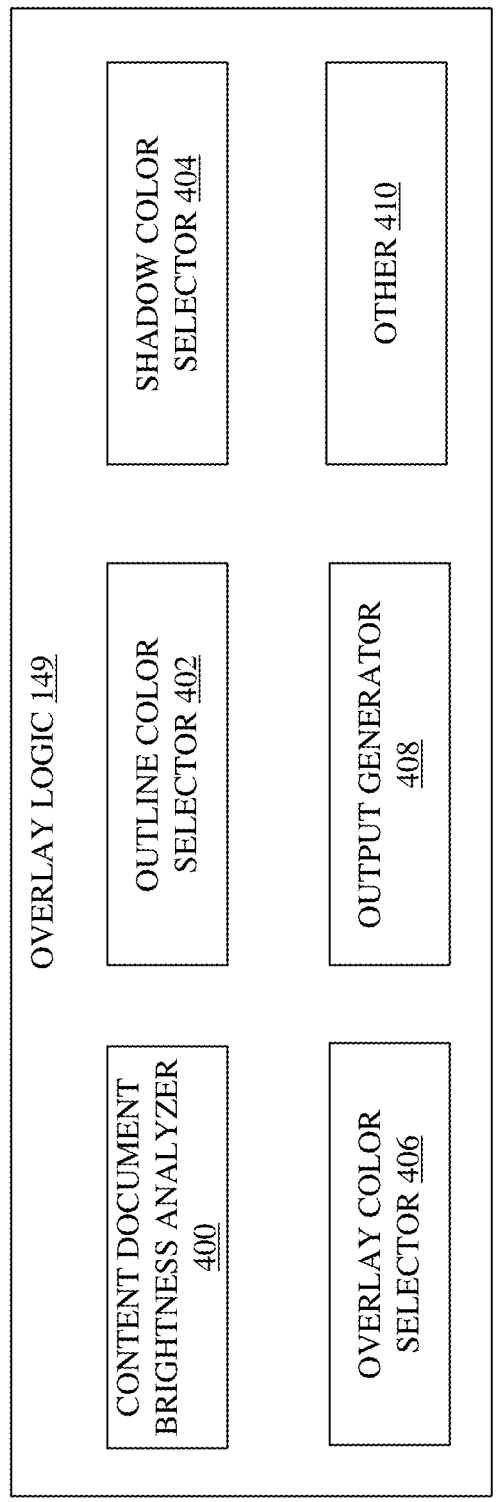
FIG. 2A is a block diagram showing one example of overlay logic, in more detail.

Drop shadow/animation logic 183 can use a combination of drop shadows with animations to convey the visual appearance that the focus area input mechanism 157 being lifted, and being held while it is being moved, and then dropped back on the content canvas 153, without changing the bounds of the object. This is just one example of how the movement can be displayed. FIG. 2A is a block diagram showing one example of overlay logic 149 in more detail. Overlay logic 149 can include content document brightness analyzer 400, outline color selector 402, shadow color selector 404, overlay color selector 406, output generator 408, and it can include other items 410. Content document brightness analyzer 400 illustratively analyzes the overall brightness of the content document being displayed on canvas 153. It can do this by identifying the font color, background color, etc., and combining them to obtain an overall brightness value for the content document. It can do this in a wide variety of other ways as well. Based on the overall brightness value, outline color selector 402 identifies an outline color to visually define the boundary of focus area input mechanism 157. It can do this by accessing a mapping of brightness values to boundary colors, or by performing a dynamic calculation or in other ways. Shadow color detector 404 identifies a shadow color for focus area input mechanism 157 based on the brightness value and/or based on the outline color as well. Again, it can do this by accessing a predefined mapping or in other ways. Overlay color selector 406 selects an overlay color for the focus area input mechanism 157 and for the overlay displayed over the content document in areas of the canvas 153 not covered by the focus area input mechanism 157. This can be done based on the brightness value and/or any or all of the other colors selected. Output generator 410 generates an output signal indicative of the selected colors, so they can be used in rendering the visual focus area input mechanism 157, with all of its visual characteristics, and the overlay.

Figure 4F:
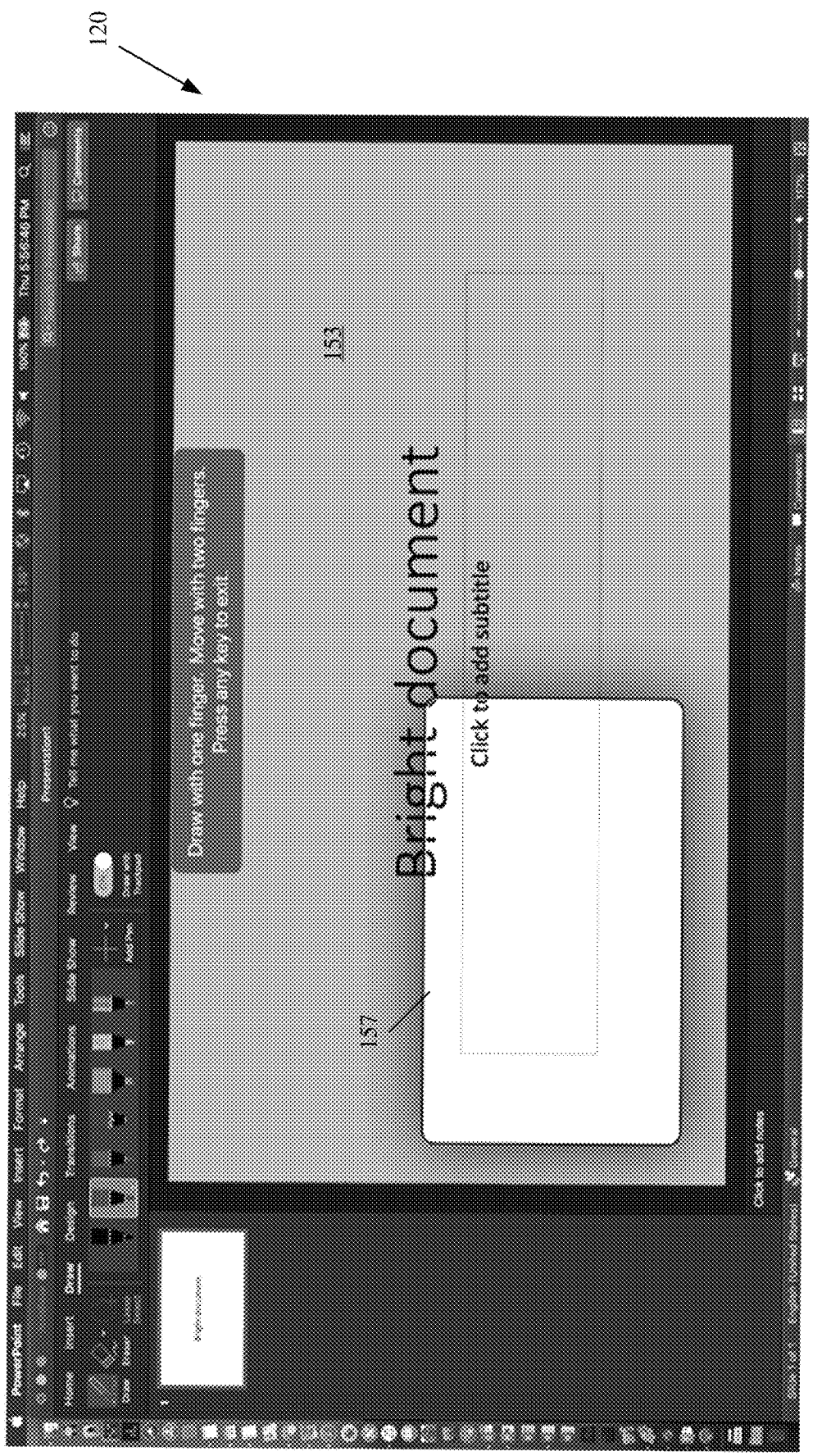

Some examples may be helpful. FIG. 4F shows an example in which the content document on canvas 153 has a relatively bright overall brightness value. In that case, focus area input mechanism 157 has a bright color and its boundaries are delineated by a relatively dark line. Its shadow is relatively dark as well, so focus area input mechanism 157 shows enhanced visual contrast relative to the content document on canvas 153.

Figure 3A:
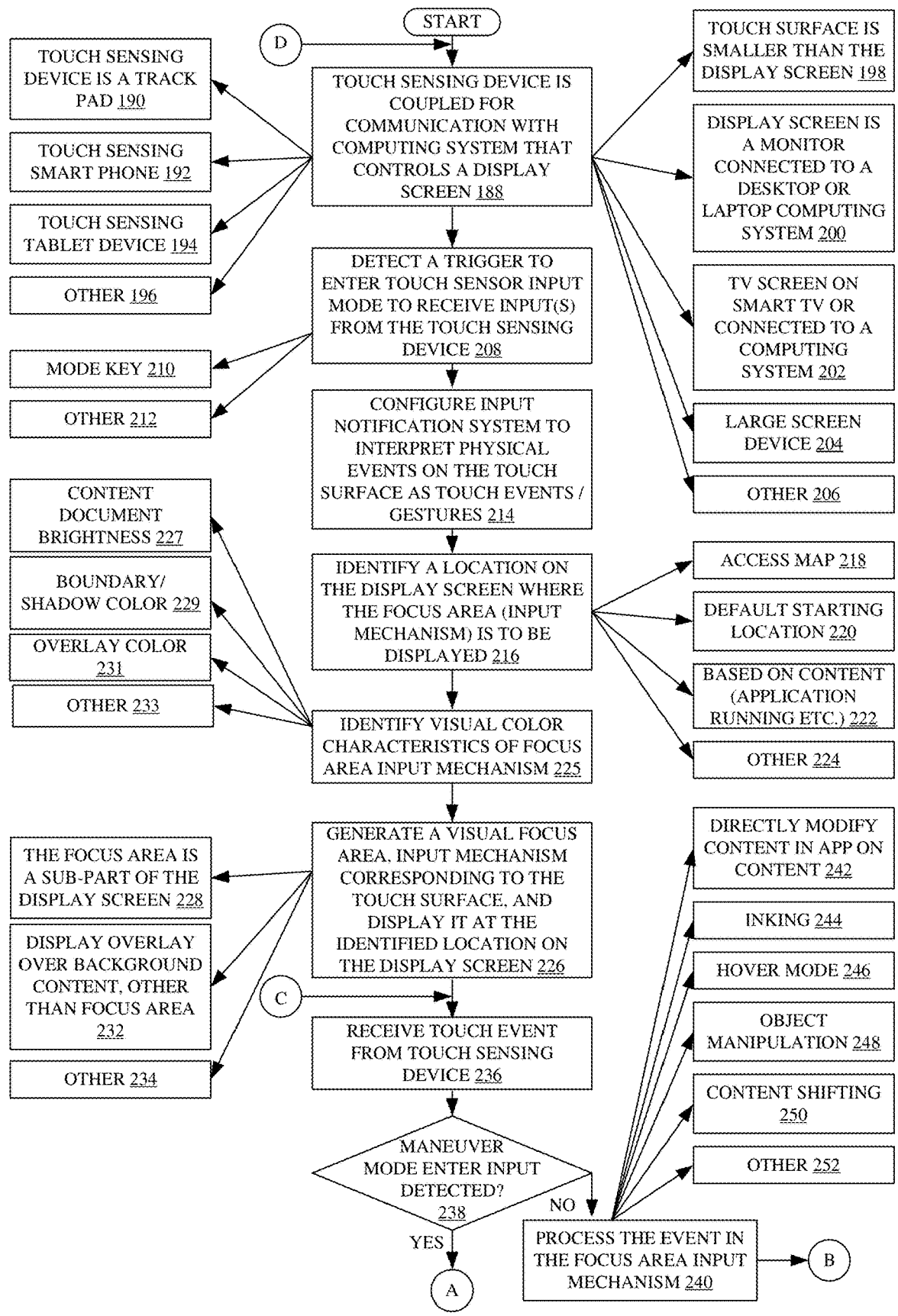
FIGS. 3A-3B (collectively referred to herein as FIG. 3) illustrate a flow diagram showing one example of the operation of a touch sensing device input processing system, in more detail.
Figure 3B:
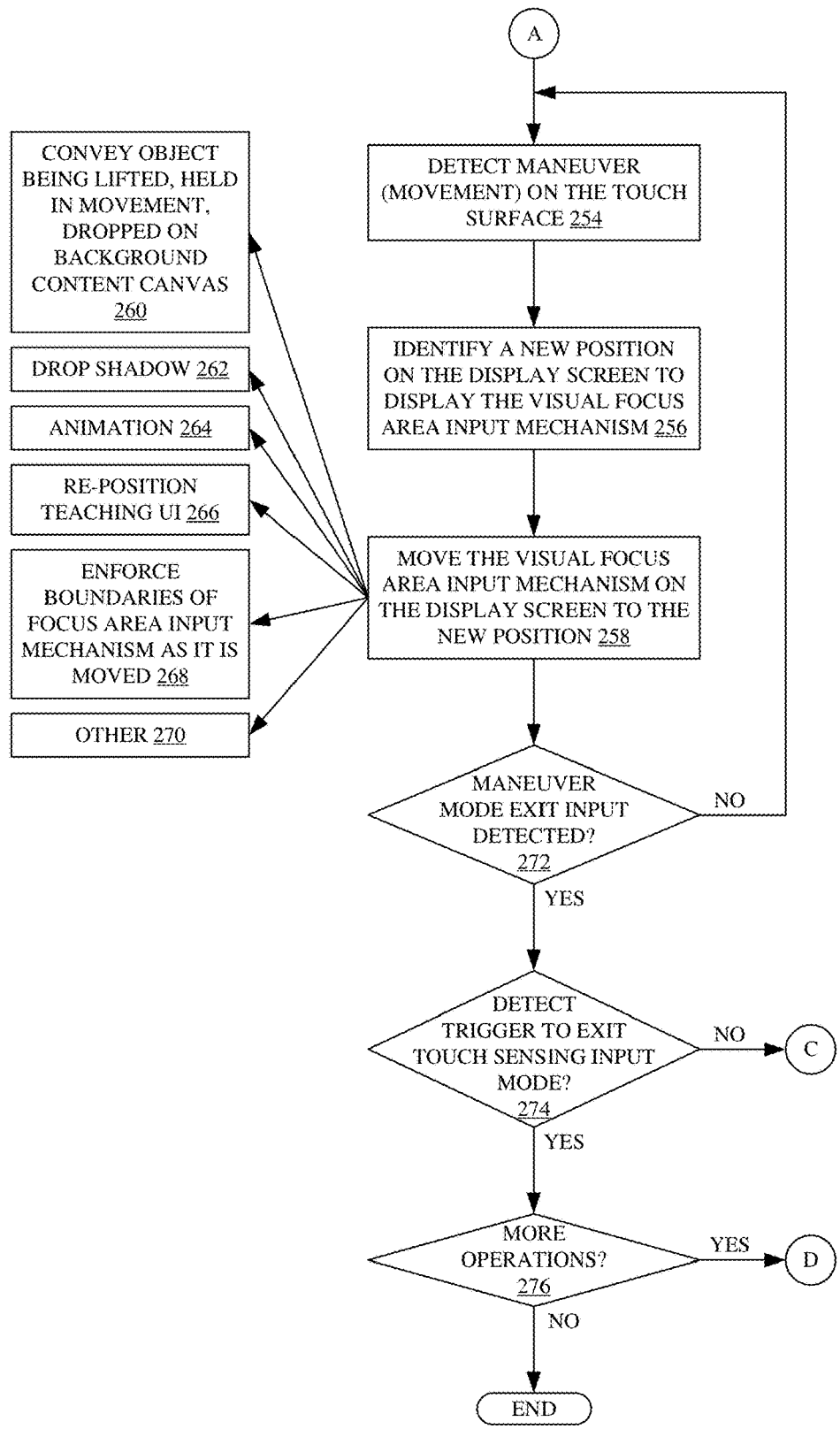
Figure 3C:
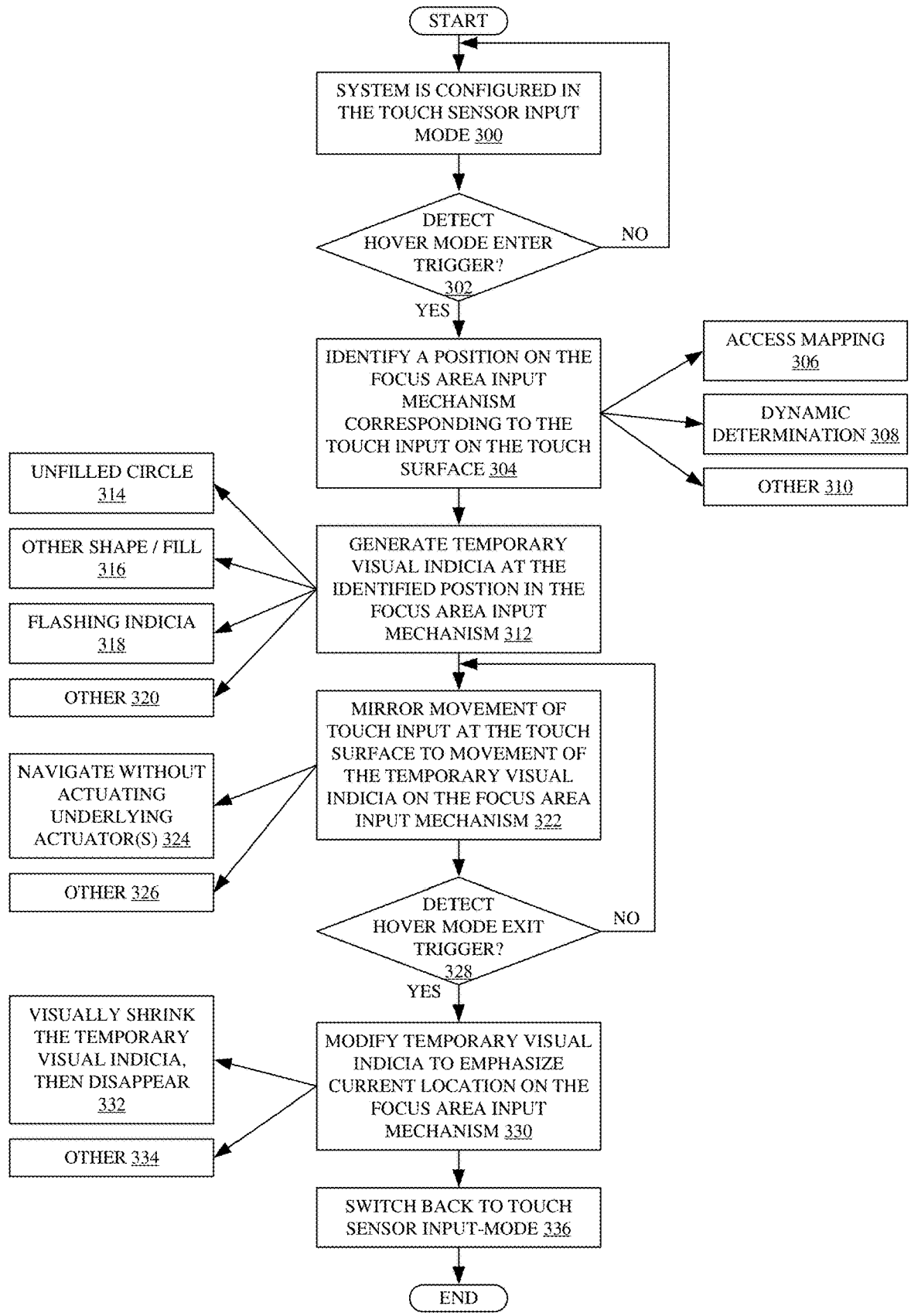
FIG. 3C is a flow diagram showing one example of the operation of the hover mode processing system, in more detail.
Figure 4G:
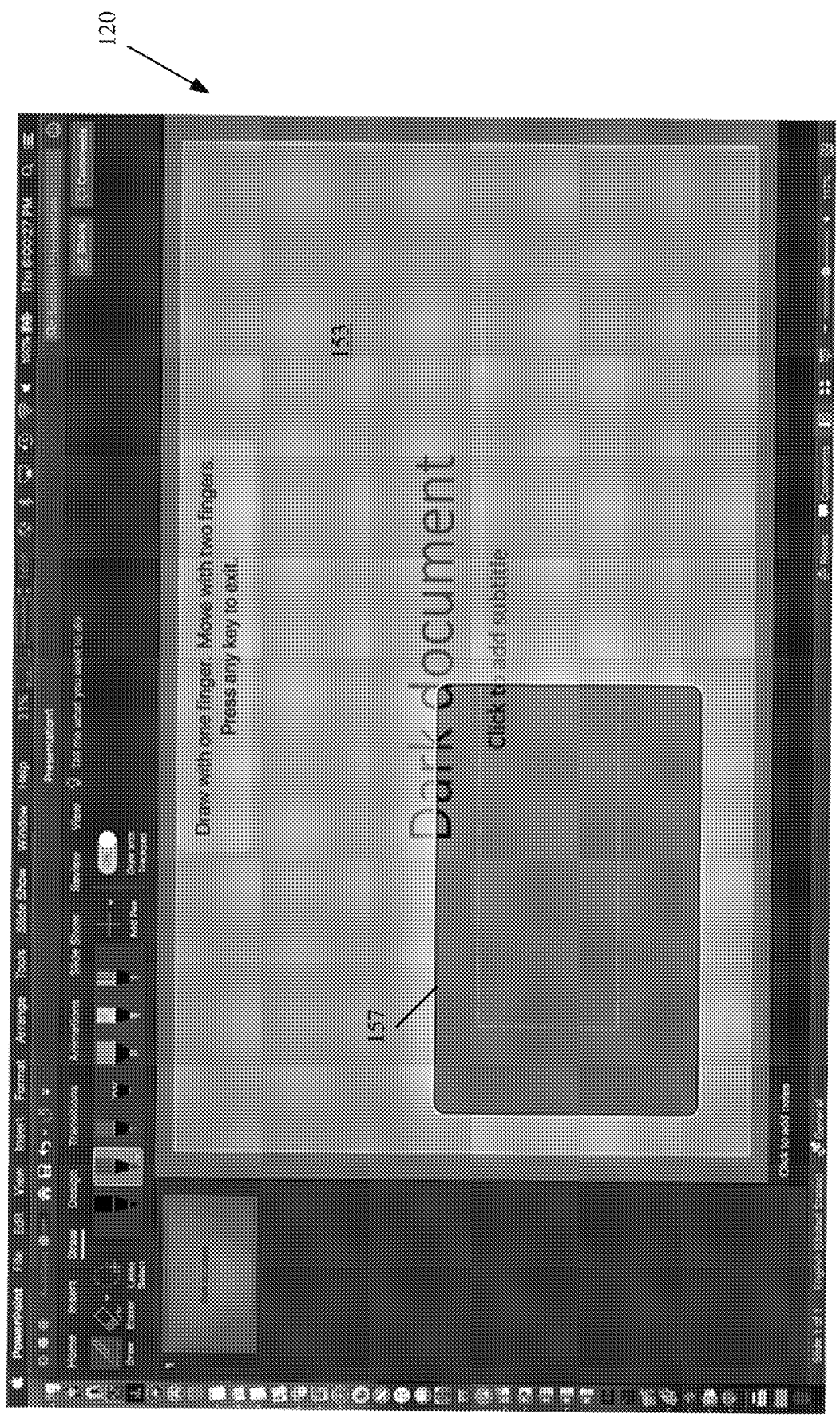

FIG. 4G is similar to FIG. 4F except that the content document on canvas 153 has a relatively dark brightness value. In that case, focus area input mechanism 157 is relatively dark, and its boundaries are delineated by a relatively light-colored line, while its shadow is relatively light as well. This enhances the visual contrast of focus area input mechanism 157 relative to the content document on canvas 153 as well. FIGS. 3A and 3B (collectively referred to herein as FIG. 3) illustrate a flow diagram showing one example of the operation of touch sensing device input processing system 132. FIGS. 1-3 will now be described in conjunction with one another.

It is first assumed that touch sensing device 102 is coupled for communication with computing system 104, which, itself, controls a display screen device 106 (and a display screen 120). This is indicated by block 188 in the flow diagram of FIG. 3. In one example, the touch sensing device 102 can be a track pad as indicated by block 190. It can be a touch sensing smart phone as indicated by block 192. It can be a touch sensing tablet computing device as indicated by block 194, or it can be a wide variety of other devices 196.

Also, in one example, touch sensing surface 108 is smaller than the display screen 120. This is indicated by block 198. The display screen 120 may be a monitor connected to a desktop or a laptop computing system, as indicated by block 200. It may be a television screen on a smart TV or another monitor or display device connected to computing system 104. This is indicated by block 202. It may be any of a wide variety of different large screen devices as well, as indicated by block 204. The display screen device 206 can be other devices 208 as well.

At some point, alternate input mode trigger detector 146 detects a trigger to enter the touch sensor input mode so that computing system 104 receives inputs from the touch sensing device 102. This is indicated by block 208 in the flow diagram of FIG. 3. This can be done in a wide variety of different ways. For instance, user 116 can actuate a mode key or switch (such as mode switch 155 shown in FIG. 2A) as indicated by block 210. In another example, the user can trigger the alternate input (or touch sensor input) mode in a wide variety of other ways as well, and this is indicated by block 212.

In response, notification system interaction logic 148 interacts with input notification system 130, to configure it to interpret physical events on the touch sensing surface 108 as touch events or touch gestures. As discussed above, it can configure touch sensing device input receiving logic 140 to receive the inputs and physical event-to-touch event conversion logic 142 to interpret those inputs as touch inputs. Configuring the input notification system 130 in this way is indicated by block 214 in the flow diagram of FIG. 3.

Input area-to-display screen mapping logic 150 then identifies a location on the display screen 120 where the focus area input mechanism 157 is to be displayed. This is indicated by block 216. This can be done in a wide variety of different ways. For instance, logic 150 can access a pre-existing map which maps the focus area input mechanism 157 corresponding to such touch sensing surface 108 to a pre-defined starting location on screen 120. Accessing a map is indicated by block 218. It can identify a default starting location as indicated by block 220 or the starting location can be based on context, as indicated by block 222. For instance, screen 120 and device 102 can be queried for their size, or the starting location of the focus area input mechanism 157 may depend on the particular content that is on the content canvas 153 being displayed. By way of example, if the content canvas 153 is displaying a word processing document with a table, then the focus area input mechanism 157 may start out over the table so that the user can quickly enter information, using touch gestures, on the table. The starting location of the focus area input mechanism 157 may depend on the particular application that is being run, or it may depend on a wide variety of other context or other items as well. Identifying the location to display the focus area input mechanism 157 in other ways is indicated by block 224.

Overlay logic 149 then identifies the physical color characteristics of the focus area input mechanism 157 as discussed above. This is identified by block 225. It can identify content documents brightness 227, boundary and shadow color 229, overlay color 231 and a wide variety of other visual characteristics 233. For instance, the focus area input mechanism 157 can be displayed at a location on the content canvas 153, and the remaining portion of the content canvas 153 can have its color changed or modified to highlight this. For instance, if the underlying content is light, then the overlay may be a darker skewed color. If the underlying content is dark, then the overlay may be a lighter skewed color. These are examples only.

Focus area generator logic 152 then generates a representation of the focus area input mechanism 157, based on the output signal from logic 149, and provides this to display screen device 106 which displays a visual focus area input mechanism 157, corresponding to the touch sensing surface 108, and displays it at the identified location on the display screen 120. This is indicated by block 226. In one example, because the touch sensing surface 108 is smaller than display screen 120, the focus area input mechanism 157 is displayed as a sub-part of screen 120. That is, the touch sensing surface 108 is not mapped to the entire screen 120, but is instead only mapped to a sub-part of that which is defined by the focus area input mechanism 157. Displaying the focus area input mechanism 157 as a sub-part of the display screen 120 is indicated by block 228 in the flow diagram of FIG. 3.

Focus area generator logic 152 can display the overlay over the background content canvas 153, in areas other than the area of the focus area input mechanism 157. This is indicated by block 232. The visual focus area input mechanism 157 can be displayed in other ways as well, and this is indicated by block 234.

At this point, system 132 has configured computing system 104 to receive touch inputs through physical events on touch sensing surface 108. It has also generated and displayed a focus area input mechanism 157 where those inputs will be located on the content canvas 153.

It is next assumed that computing system 104 (and specifically touch sensing device input receiving logic 140) receives a touch event from touch sensing device 102. For instance, user 116 may have physically interacted with touch sensing surface 108. Receiving this touch event is indicated by block 236 in the flow diagram of FIG. 3.

It may be that the touch input is detected by maneuver mode entry detector 158 as an input indicating that user 116 wishes to change the location of the focus area input mechanism 157 on display screen 120. If that is not the case, and the touch input is a different type of touch event, then other touch gesture processing logic 156 processes the event to generate desired content in the area of the focus area input mechanism 157. Determining whether the input is a maneuver mode enter input or another touch input is indicated by block 238. Processing the event (which is not a maneuver mode enter input) to perform a touch gesture operation is indicated by block 240.

The touch gesture operations can be performed in a wide variety of different ways. In one example, they directly modify content in the application being run, on the displayed content canvas 153. This is indicated by block 242. In an example, the operation is an inking operation which can be conducted using a light touch input, instead of one that requires extra pressure by user 116. This is indicated by block 244. In another example, the touch input can be an input indicating that user 116 wishes to enter a hover mode, in which movement of the user's finger across touch sensing surface 108 is mirrored in the focus area input mechanism 157 on screen 120. This is indicated by block 246 and is described below with respect to FIGS. 2B, 3C and 4H-4L. In yet another example, object manipulation logic 172 performs an object operation (such as actuating an actuator, moving an object, etc.). This is indicated by block 248 in the flow diagram of FIG. 3. In yet another example, content shifting logic 174 performs a content shifting operation (such as panning or scrolling the underlying content canvas 153). This is indicated by block 250 in the flow diagram of FIG. 3. Processing the event in the focus area input mechanism 157 can be done in a wide variety of other ways as well, and this is indicated by block 252.

Returning to block 238, if maneuver mode entry detector 158 does detect that the user input is an input indicating that user 116 wishes to move or maneuver the focus area input mechanism 157 on screen 120, the processing continues at block 254 where maneuver detector 160 detects the user touch input indicating how user 116 wishes to move the focus area input mechanism on screen 120. This is indicated by block 254.

It should be noted that the maneuver mode enter input at block 238 can be a wide variety of different inputs. For instance, when the user touches touch sensing surface 108 with two fingers, as discussed above, this may be a trigger that is detected by detector 158. The user may enter the maneuver mode by actuating a mode switch or button or a different key, by performing a double tap or another touch gesture, or in a wide variety of other ways.

It should also be noted that the user can provide an input indicating how the user wishes to move the focus area input mechanism on screen 120 in a variety of different ways as well. In the example discussed herein, it is assumed that the user touches the touch sensing surface 108 with two fingers indicating that the user wishes to move the focus area input mechanism 157, and then user begins sliding his or her fingers in the direction the user wishes to move the focus are input mechanism 157 on screen 120.

As this is happening, maneuver detector 160 detects the maneuver based on events on the touch surface 108, and maneuver-to-display screen position logic 164 identifies a new position on the display screen 120 to display the visual focus area input mechanism 157, in response to the user maneuver inputs. This is indicated by block 256. This can be done using a mapping, using a dynamic calculation, using a predetermined correlation, or in a wide variety of other ways.

Input mechanism movement display generator 162 then moves the visual focus area input mechanism 157 on the display screen 120 to the new position. Moving the visual focus area input mechanism on the display screen to the new position is indicated by block 258. It can do this in a wide variety of different ways. For instance, as discussed above with respect to FIG. 2, drop shadow/animation logic 183 can perform the maneuver to convey an object being lifted, held while it is moved, and dropped on the background content canvas. This is indicated by block 260 in the flow diagram of FIG. 3. It can do this using drop shadows as indicated by block 262, and/or using animation as indicated by block 264.

Similarly, teaching UI position logic 180 can reposition any teaching UI displayed on the canvas as well. This is indicated by block 266. Input mechanism boundary processing logic 182, as described above with respect to FIG. 2, can also enforce the boundaries of the focus area input mechanism 157, as it is being moved on screen 120. This is indicated by block 268. The visual focus area input mechanism 157 can be moved in other ways as well. This is indicated by block 270.

At some point, maneuver mode exit detector 166 will detect an input indicating that user 116 wishes to exit the maneuver mode. This is indicated by block 272. Until this occurs, processing reverts to block 254 where the maneuver is detected and the focus are input mechanism 157 is continuously moved.

The maneuver mode exit input can be a wide variety of different inputs. For instance, where the user has used two-finger touch to enter that mode, simply lifting one finger off of touch sensing surface 108 may be used to exit the mode. The user can exit the mode with a mode switch, with different touch gestures, mouse clicks, or in other ways.

Alternate input mode trigger detector 146 determines whether an input is received indicating that user 116 wishes to exit the touch sensor input mode. This is indicated by block 274. As with the other modes, this can be done in a variety of different ways using touch gestures, button actuations, mouse clicks, key actuations, etc. If not, processing reverts to block 236 where the system continues to process touch gestures. If so, then system 132 determines whether computing system 104 is continuing to operate. If so, processing reverts to block 188. If not, the processing ends. This is indicated by block 276.

Returning again to block 246, assume now that the user wishes to enter a hover mode. This will now be described in more detail.

Figure 2B:
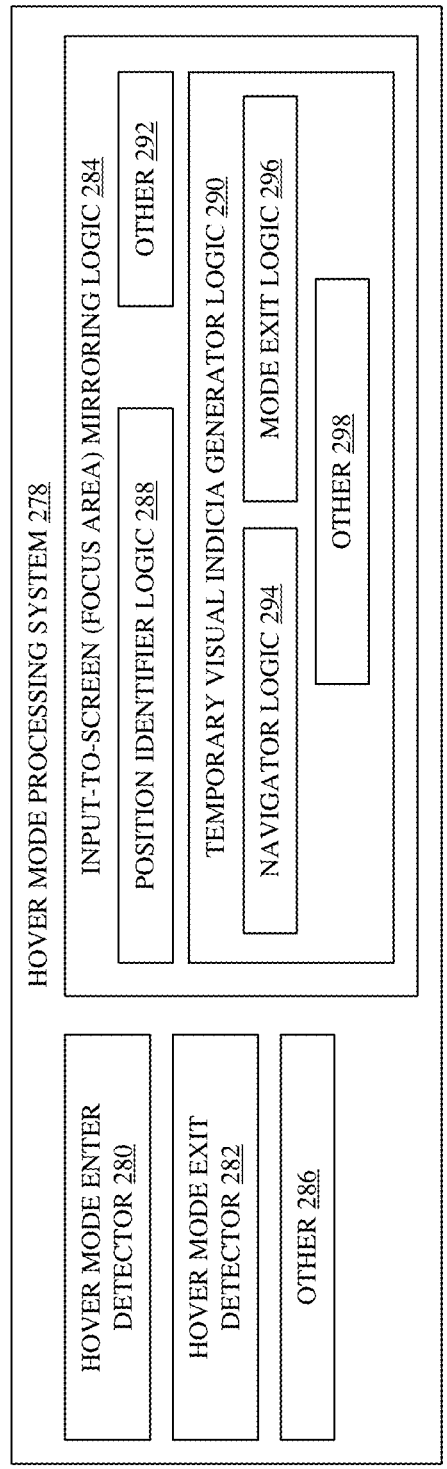
FIG. 2B is a block diagram showing one example of a hover mode processing system, in more detail.

FIG. 2B is a block diagram showing one example of hover mode processing system 155, in more detail. Hover mode processing system 155 illustratively includes hover mode enter detector 280, hover mode exit detector 282, input-to-screen (focus area) mirroring logic 284 and it can include a wide variety of other items 286. Hover mode enter detector 280 detects a user input by user 116 indicating that user 116 wishes to enter the hover mode. In the hover mode, system 155 will mirror, on screen 120, the finger movements of user 116 on touch sensing surface 108, within the focus area input mechanism 157 on screen 120, without actuating underlying actuators on the canvas 153 or performing other interactive operations (like drawing or otherwise modifying the content of the content document). By way of example, if the user is in the hover mode, the user may move his or her finger from the lower left corner of touch sensing surface 108 to the upper right corner of touch sensing surface 108. In response, system 155 will mirror that input by displaying temporary visual indicia that starts in the lower left hand corner of the focus are input mechanism 157 on screen 120 and moves to the upper right corner of the focus are input mechanism 157 on screen 120, as the user moves his or her finger in that direction on touch sensing surface 108.

The hover mode trigger may be a wide variety of different triggers. For instance, the user may actuate a mode switch, provide a specific touch gesture or mouse click or key actuation, or other trigger.

Once the hover mode enter detector 280 has detected an input indicating that the user 116 wishes to enter the hover mode, then input-to-screen (focus area) mirroring logic mirrors the position of the user's finger on touch sensing surface 108, on the focus area input mechanism 157 on screen 120. Thus, logic 284 includes position identifier logic 288, visual indicia generator logic 290, and it can include other items 292. Visual indicia generator logic 290 can include navigator logic 294, mode exit logic 296, and other items 298. Position identifier logic 288 identifies a position of the user's touch on touch sensing surface 108, when the user enters the hover mode. It then identifies a corresponding position on the focus area input mechanism 157 being displayed on display screen 120. It can do this using a predetermined mapping, using a dynamic calculation, or in a wide variety of other ways. Once the position on the focus area input mechanism 157 is identified, temporary visual indicia generator logic 290 generates a temporary visual indicia, at that position, on the focus area input mechanism 157. This can be a wide variety of different types of indicia, such as an unshaded circle, a shaded square or other geometric shape, a flashing visual item, or other items.

Navigator logic 294 then tracks movement of the user's finger on touch sensing surface 108, based upon the inputs from touch sensing device 102, and correspondingly changes the position of the temporary visual indicia, on the focus area input mechanism 157 on screen 120, to correspond to the user's movement of his or her finger.

At some point, user 116 will wish to exit the hover mode and provide a corresponding user input. Hover mode exit detector 282 will detect this user input. In response, mode exit logic 296 controls the temporary visual indicia in a way to indicate that the hover mode is being exited. In one example, the temporary visual indicia shrinks to more specifically identify the point where direct input will be conducted on the focus area input mechanism 157, when the hover mode is exited. For instance, when the temporary visual indicia is an unshaded circle, then when the hover mode exit input is detected, the circle shrinks to a smaller circle, and then disappears. This will indicate to the user that, at the point on the focus area input mechanism 157 where the circle shrunk, the next input will be generated.

Figure 4H:
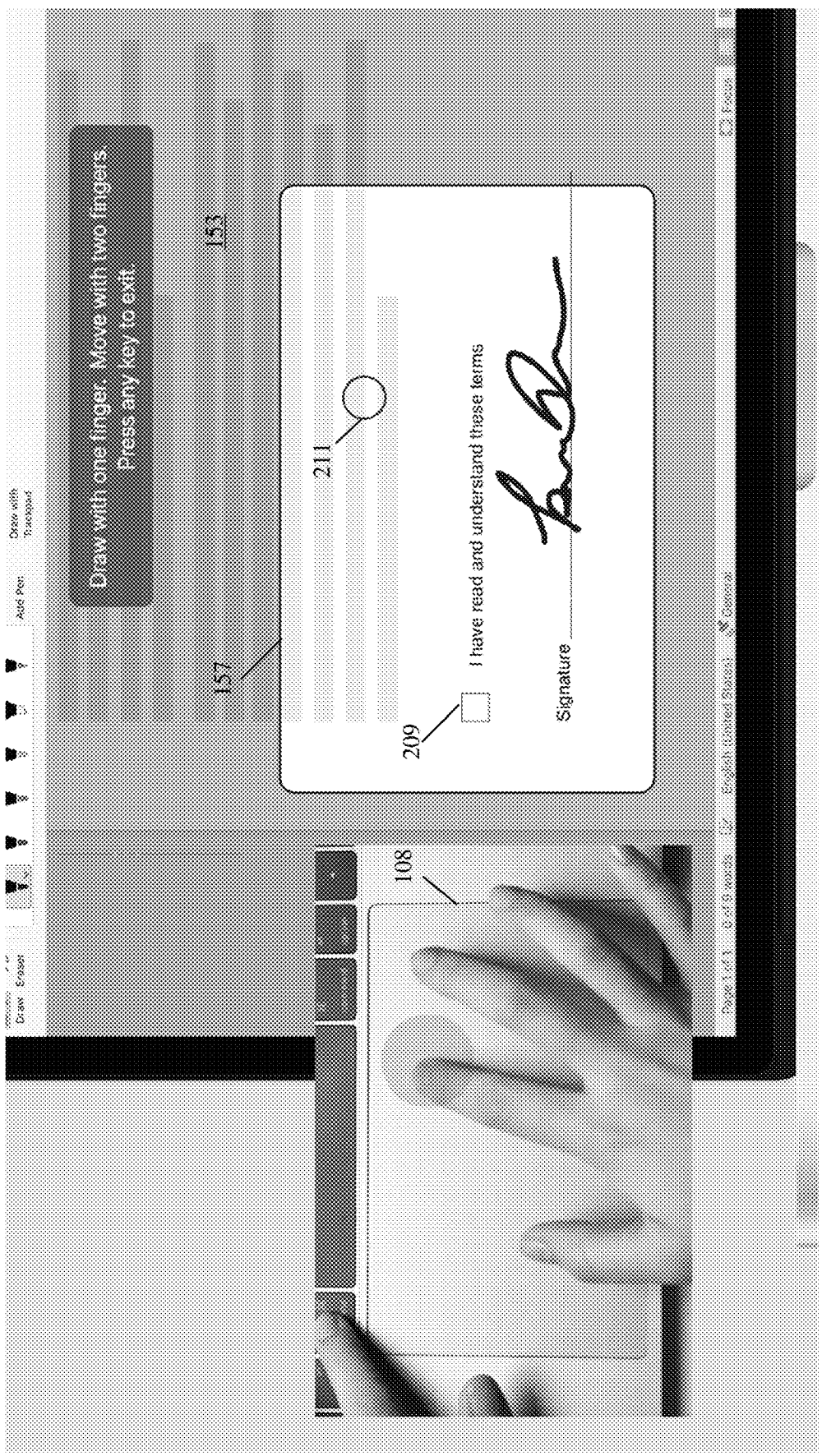

An example may be helpful. FIG. 4H shows an example in which the user has already actuated a trigger to enter the hover mode. Assume that the user wishes to draw a check mark in the check box 209 on the content document. It can be seen that temporary visual indicia 211 is now displayed at a position on focus area input mechanism 157 corresponding to the location of the user's touch input on touch sensing surface (trackpad) 108. However, because the system is in hover mode, there is no interaction (no inputs affecting) the content under the focus area input mechanism 157.

Figure 4I:
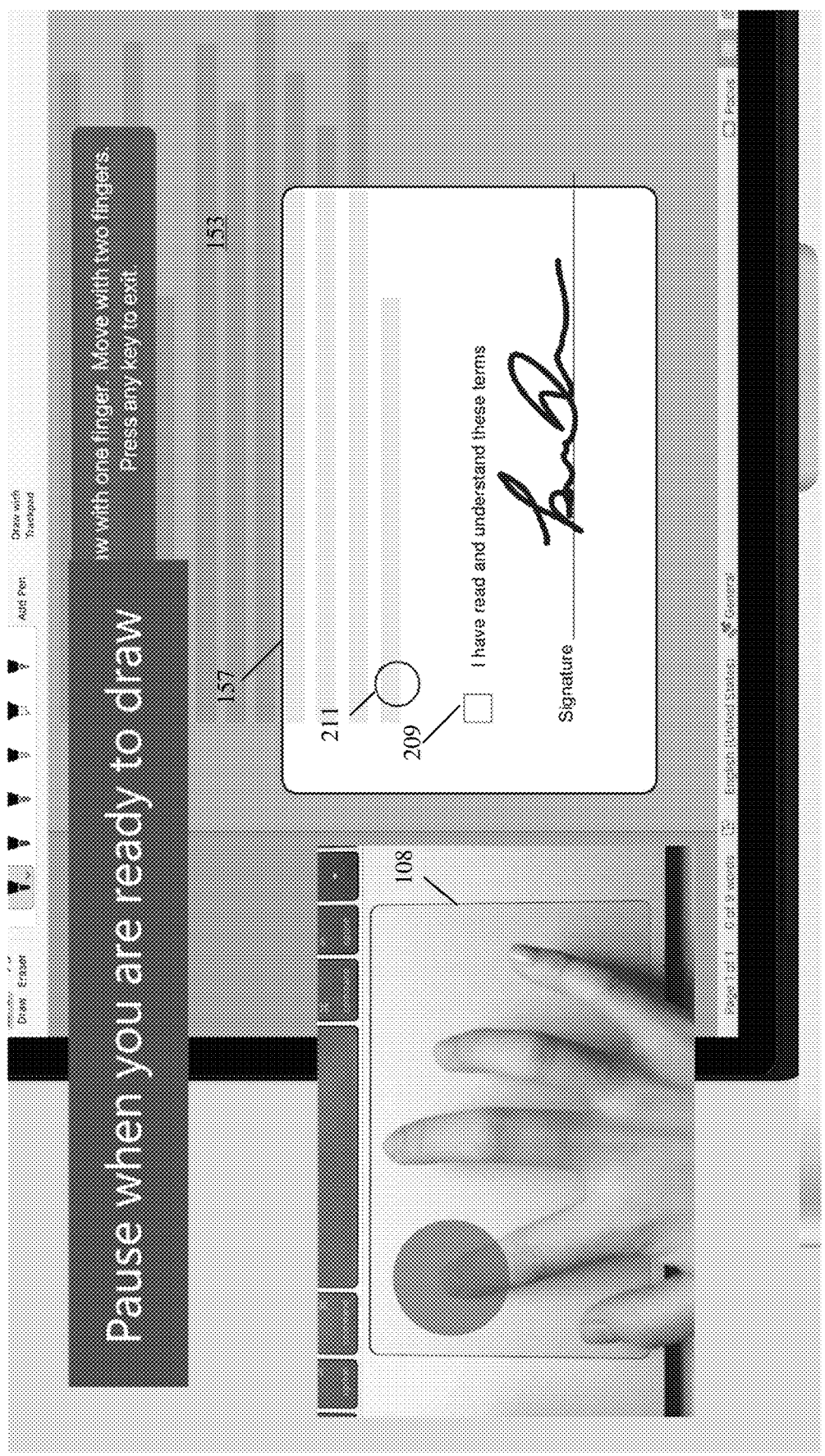
Figure 4J:
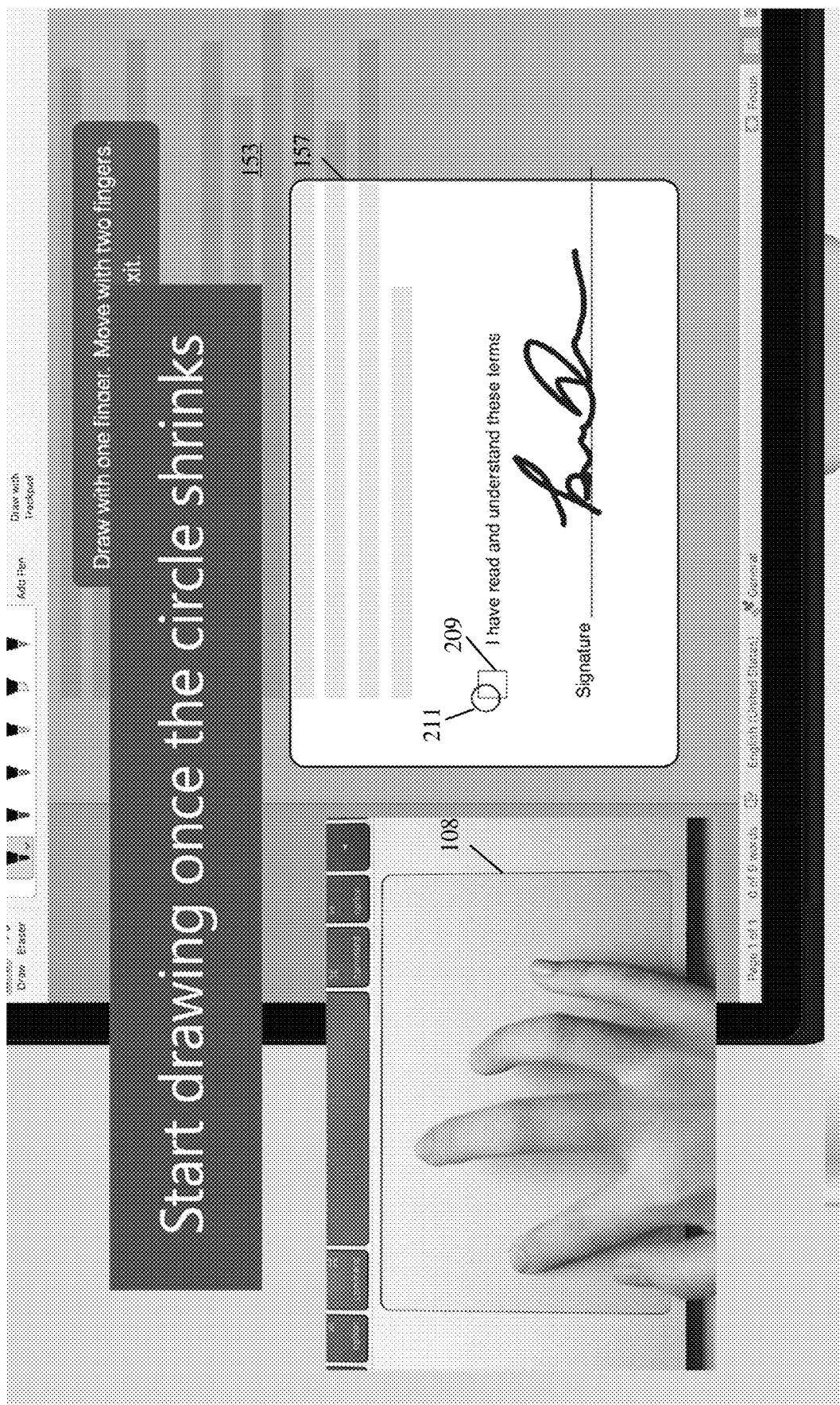

FIG. 4I shows that, as the user moves her finger across surface 108, the temporary visual indicia 211 is correspondingly moved (mirrored) on focus area input mechanism 157. The same is shown in FIG. 4J, which now shows that the user has moved to a position where she wishes to make the check mark. The user then inputs a hover mode exit trigger and the behavior of temporary visual indicia 211 changes to further focus the user's attention to the spot where input will be generated on the content document. In one example, the unshaded circle 211 shrinks to a point where it disappears. The point on focus area input mechanism 157 where it disappeared will be the spot where input to the content document will be made.

Figure 4K:
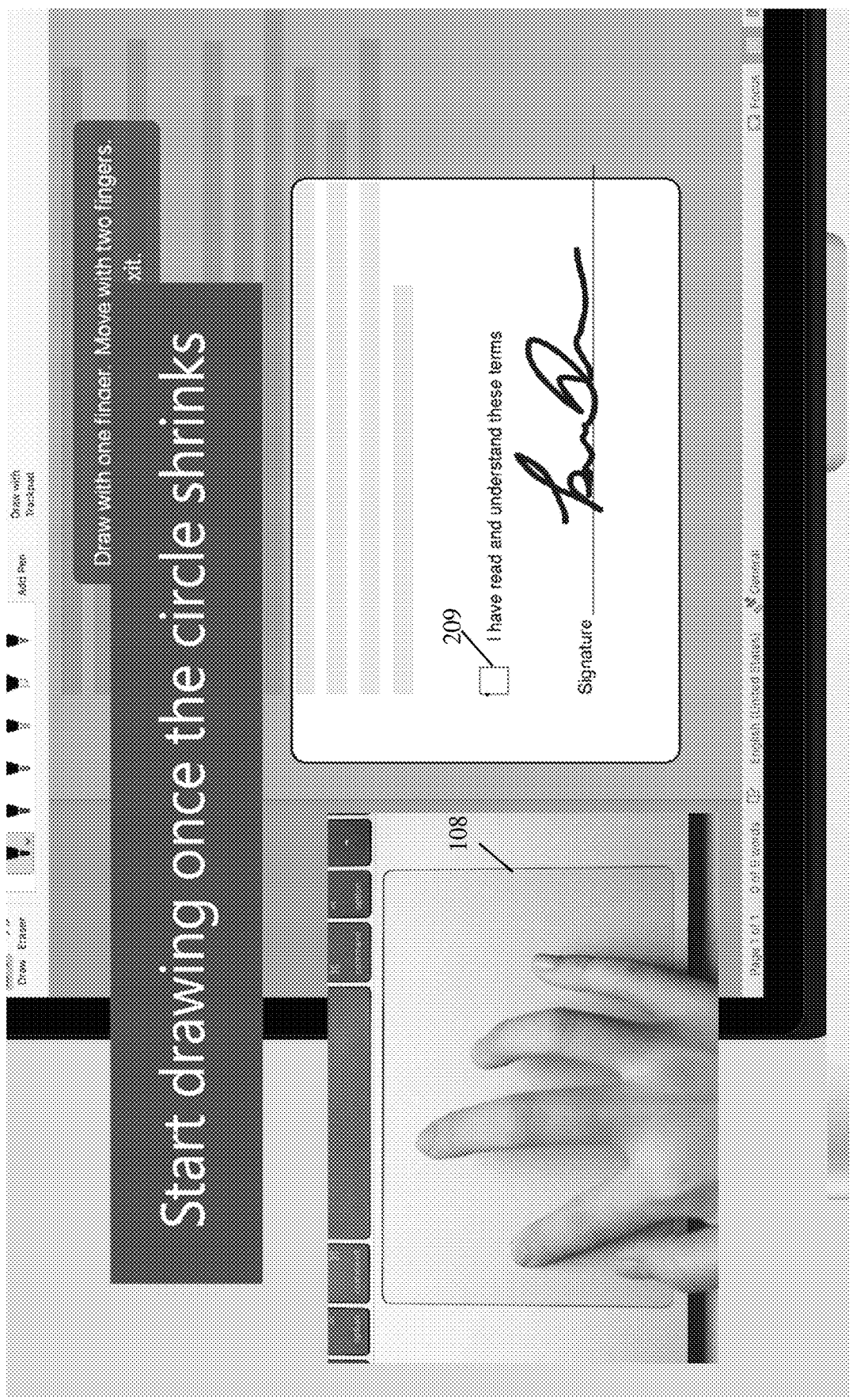
Figure 4L:
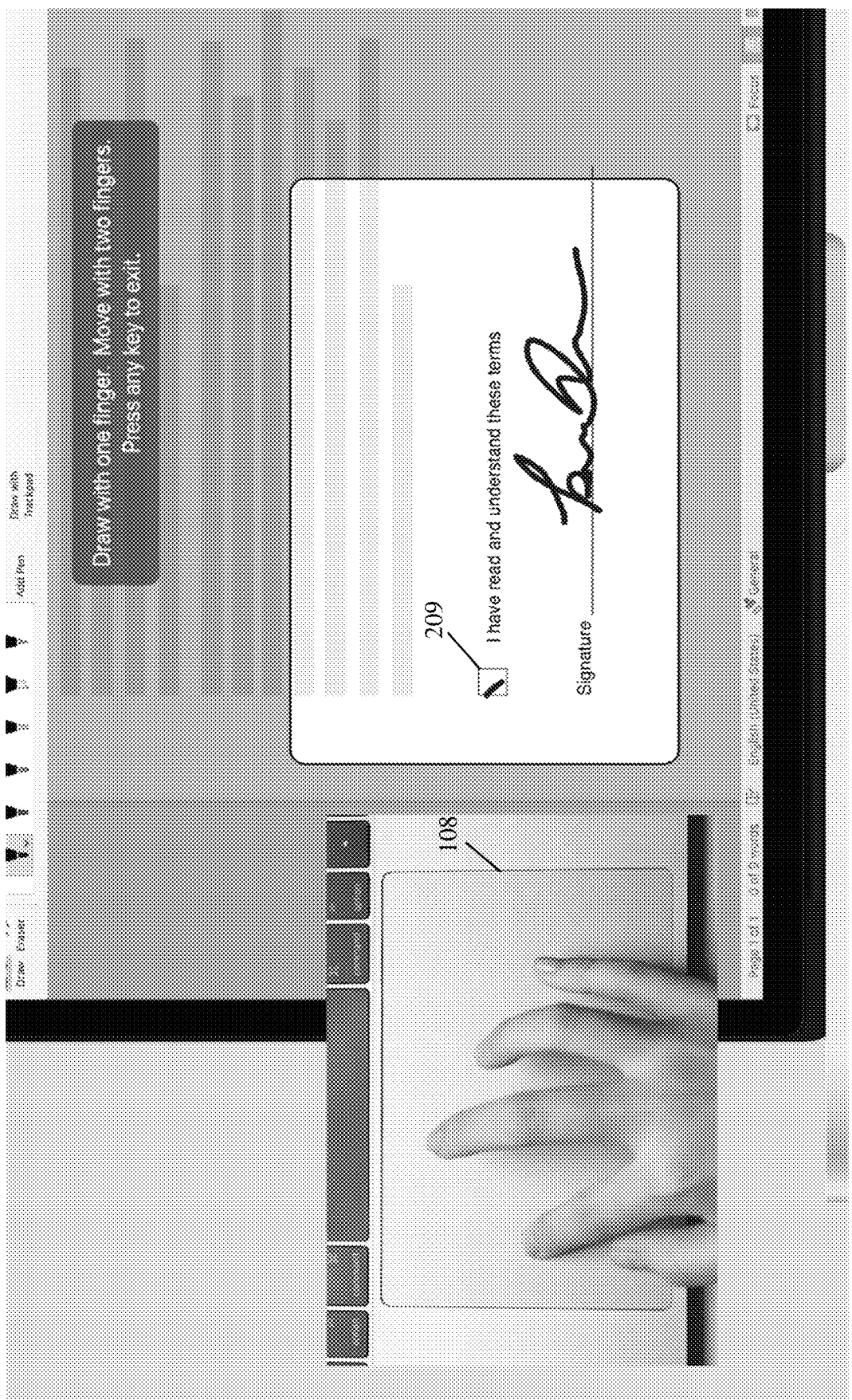

In FIG. 4K, the user has now input a hover mode exit trigger and so the system now re-enters the direct input mode where inputs through focus area input mechanism 157 are used to modify the content document. It can be seen that the user's touch has caused an inked dot at the point where the temporary visual indicia 211 disappeared. FIG. 4L shows that, as the user continues to drag her finger on surface 108, the result is an inking input that modifies the content document—in this example, by drawing a check in the check box 209.

FIG. 3C illustrates a flow diagram showing one example of the operation of hover mode processing system 155, in more detail. FIG. 3C corresponds to block 246 in FIG. 3A described above. It shows one example of hover mode processing. It is thus assumed that computing system 104 is configured in the touch sensor input mode. This is indicated by block 300 in the flow diagram of FIG. 3C. At some point, it is assumed that hover mode enter detector 280 detects an input indicating that user 116 wishes to enter the hover mode. This is indicated by block 302. Again, this can be done by the user actuating a specific key, by the user actuating a mode switch, double tapping on the touch sensing surface 108, or in a wide variety of other ways.

In response, position identifier logic 288 identifies a position on the focus area input mechanism 157 corresponding to the current touch input on the touch surface 108. This is indicated by block 304. Again, this can be done by accessing a pre-existing mapping 306, using a dynamic determination 308, or in other ways 310.

Temporary visual indicia generator logic 290 then generates a temporary visual indicia 221 at the identified position on the focus area input mechanism 157, and displays it there. This is indicated by block 312. This can be a wide variety of different types of visual indicia, such as an unfilled circle 314, another shape with any of a wide variety of different types of fill, as indicated by block 316. It can be flashing indicia 318, or a wide variety of other indicia 320.

Navigator logic 294 then mirrors movement of the touch input at the touch sensing surface 108 as movement of the temporary visual indicia on the focus area input mechanism. This is indicated by block 322 in the flow diagram of FIG. 3C. In one example, the movement is conducted by navigating the temporary visual indicia around the focus area input mechanism 157, in a way that corresponds to movement of the user's finger (or another touch movement) on touch sensing surface 108 without actuating any underlying actuators. This is indicated by block 324. The navigation or mirrored movement can be conducted in other ways as well, and this is indicated by block 326.

Hover mode exit detector 282 may detect an input indicating that user 116 wishes to exit the hover mode. This is indicated by block 328. When that occurs, mode exit logic 296 modifies the temporary visual indicia 211 to emphasize a current location on the focus area input mechanism 157. This is indicated by block 330. In one example, the logic 296 operates to visually shrink the temporary visual indicia 211 and then have it disappear. This focuses the user's attention on a specific place on the focus area input mechanism 157 where the next input will be received. This is indicated by block 332. The temporary visual indicia 211 can be modified in other ways as well, when exiting the hover mode. This is indicated by block 334.

Hover mode exit detector 282 then indicates to touch sensing device input processing system 132 that it is no longer in the hover mode and so it switches back to the touch sensor input mode. This is indicated by block 336.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
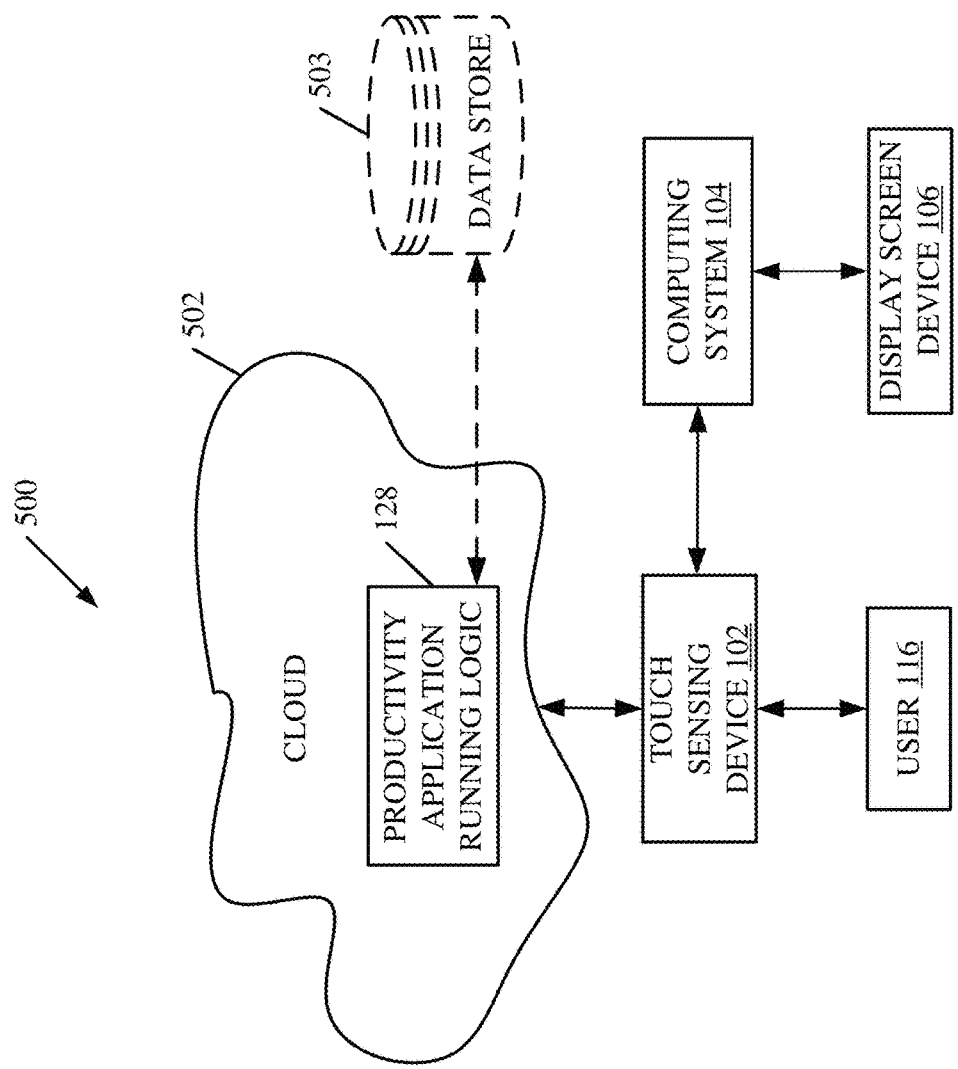
FIG. 5 shows one example of the computing system architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that productivity application running logic 128 can be located in cloud 502 (which can be public, private, or a combination where portions are public while others are private). Therefore, user 116 uses system 104 to access those systems through cloud 502.

FIG. 5 also depicts another example of a cloud architecture. FIG. 5 shows that it is also contemplated that some elements of computing system 102 can be disposed in cloud 502 while others are not. By way of example, data store 503 can be disposed outside of cloud 502, and accessed through cloud 502. Regardless of where they are located, they can be accessed directly by system 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
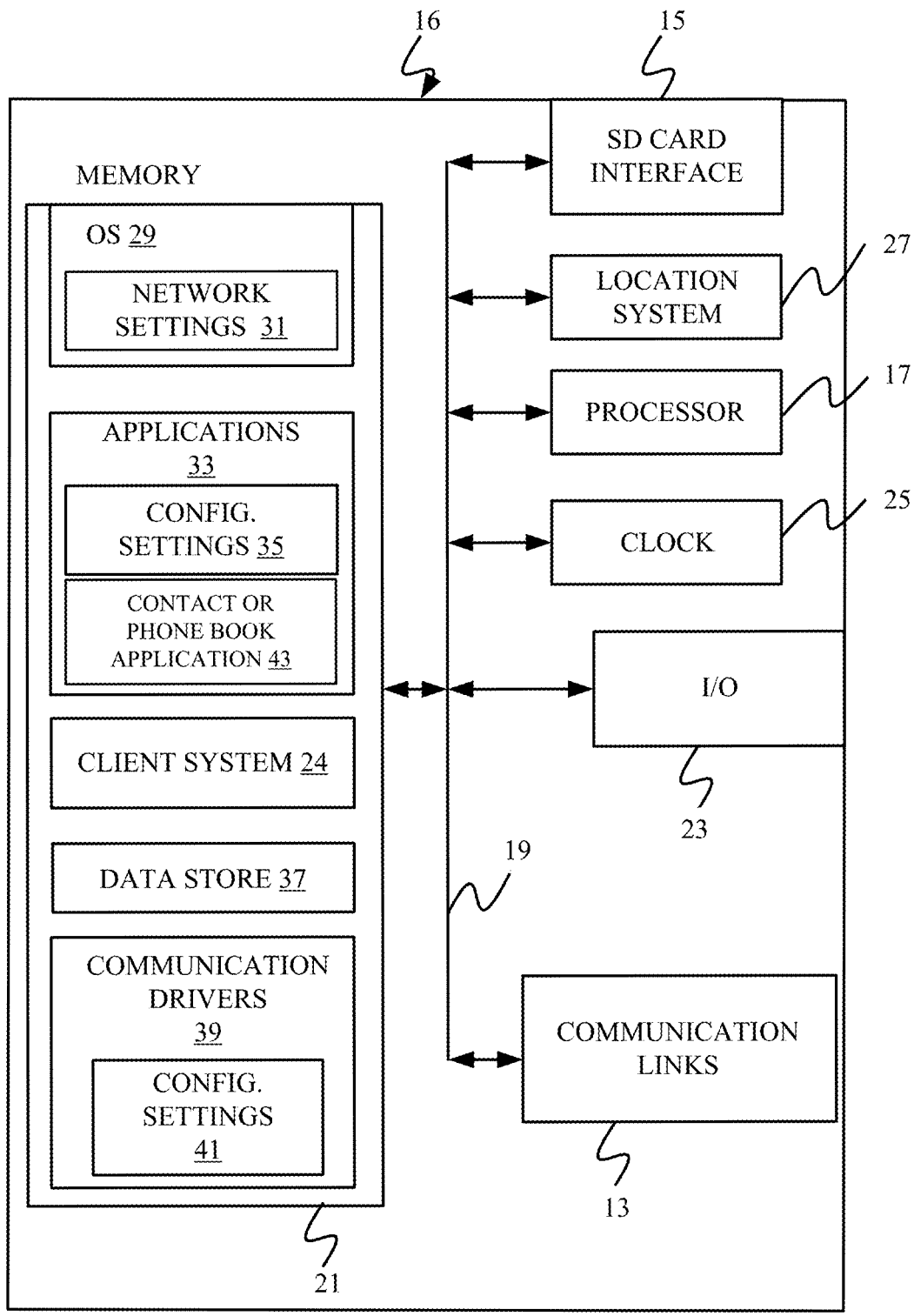
FIGS. 6-8 show examples of mobile devices that can be used as touch sensing devices in the architectures shown in the previous figures.
Figure 7:
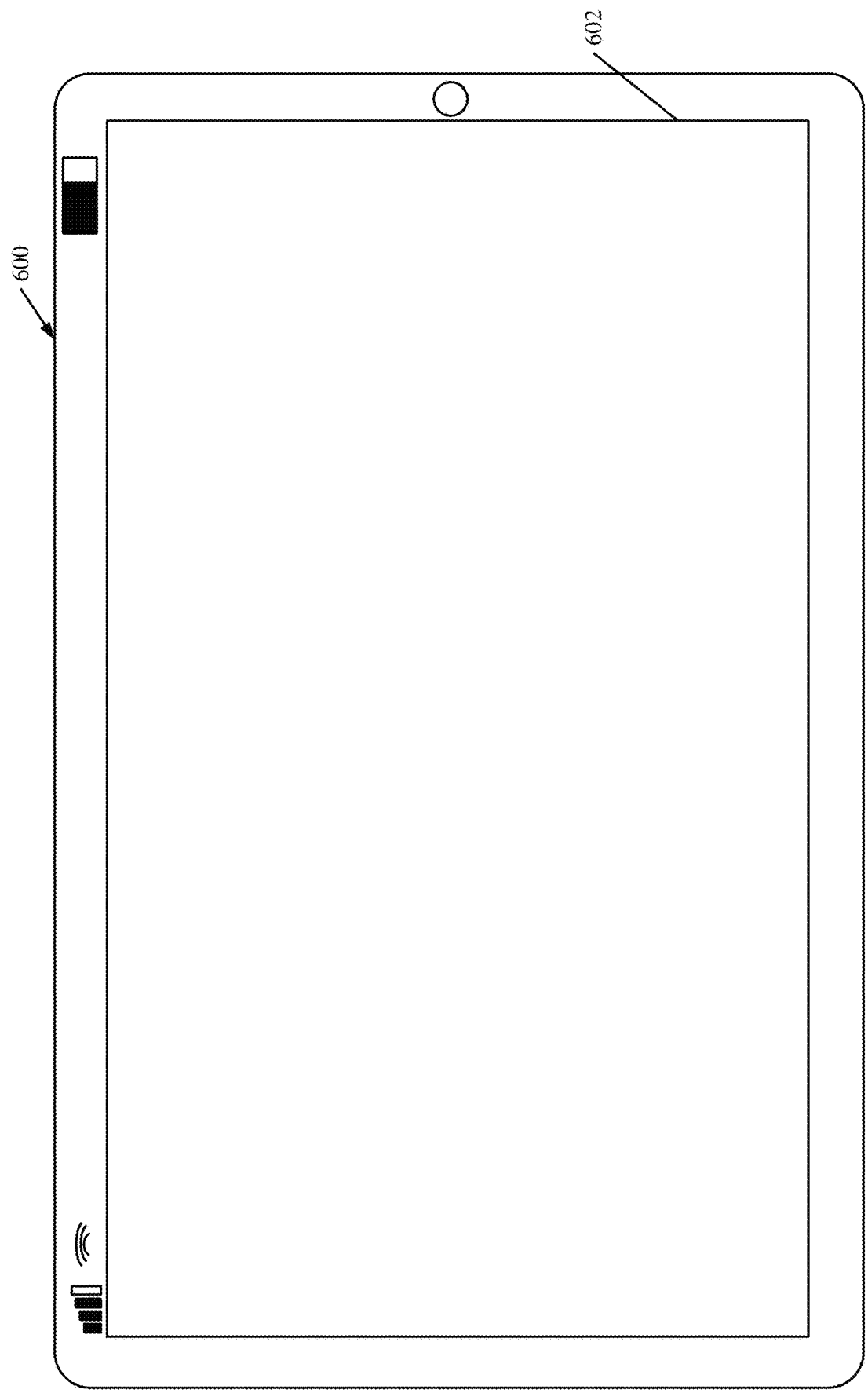
Figure 8:
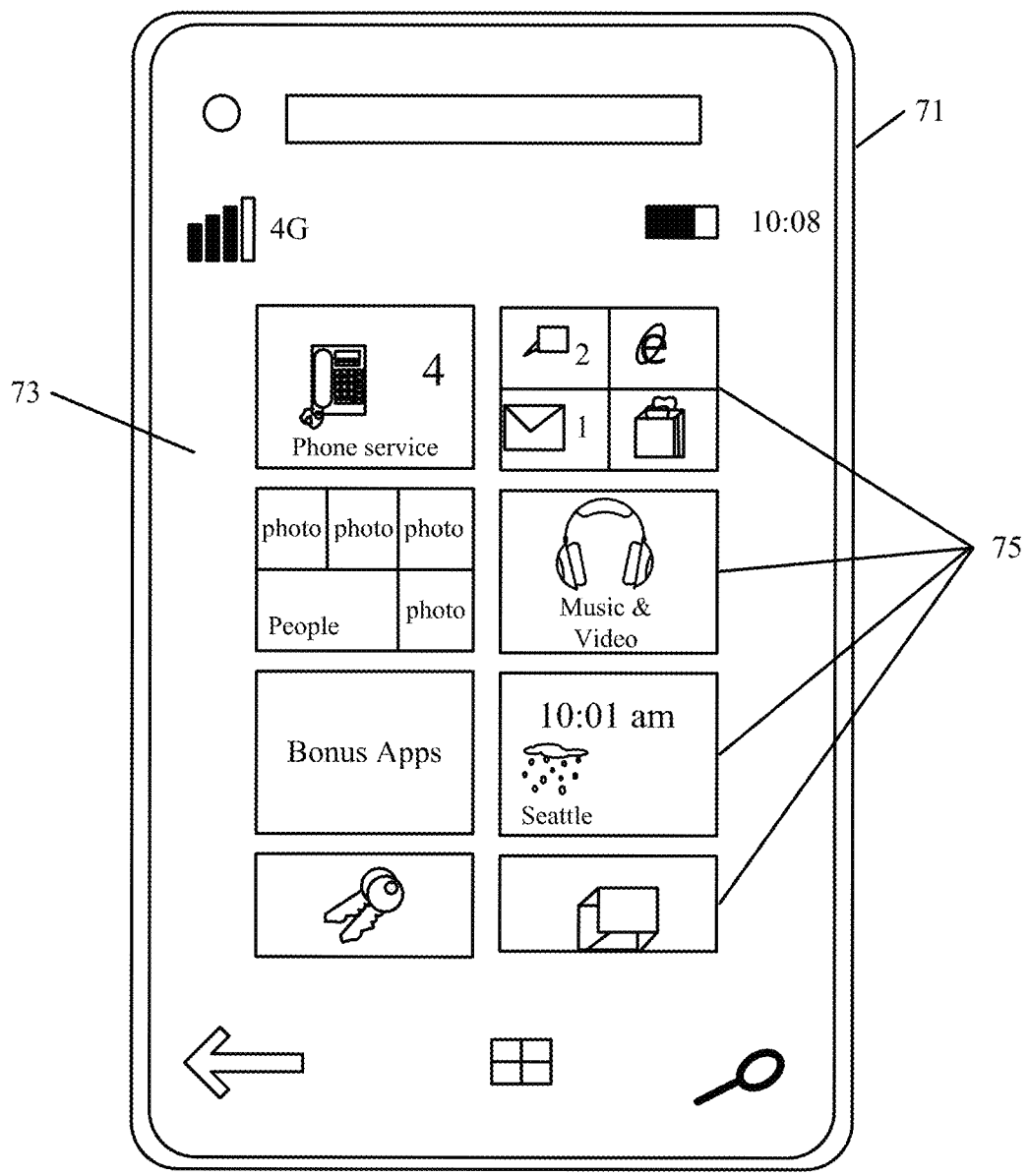

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components computing system 104 or user device 102 or that interacts with architecture 100, or both. In the device 16, a communications link 13 is provided that allows the handheld device to communicate with other computing devices and under some examples provide a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 (which, itself, may be device 102) is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
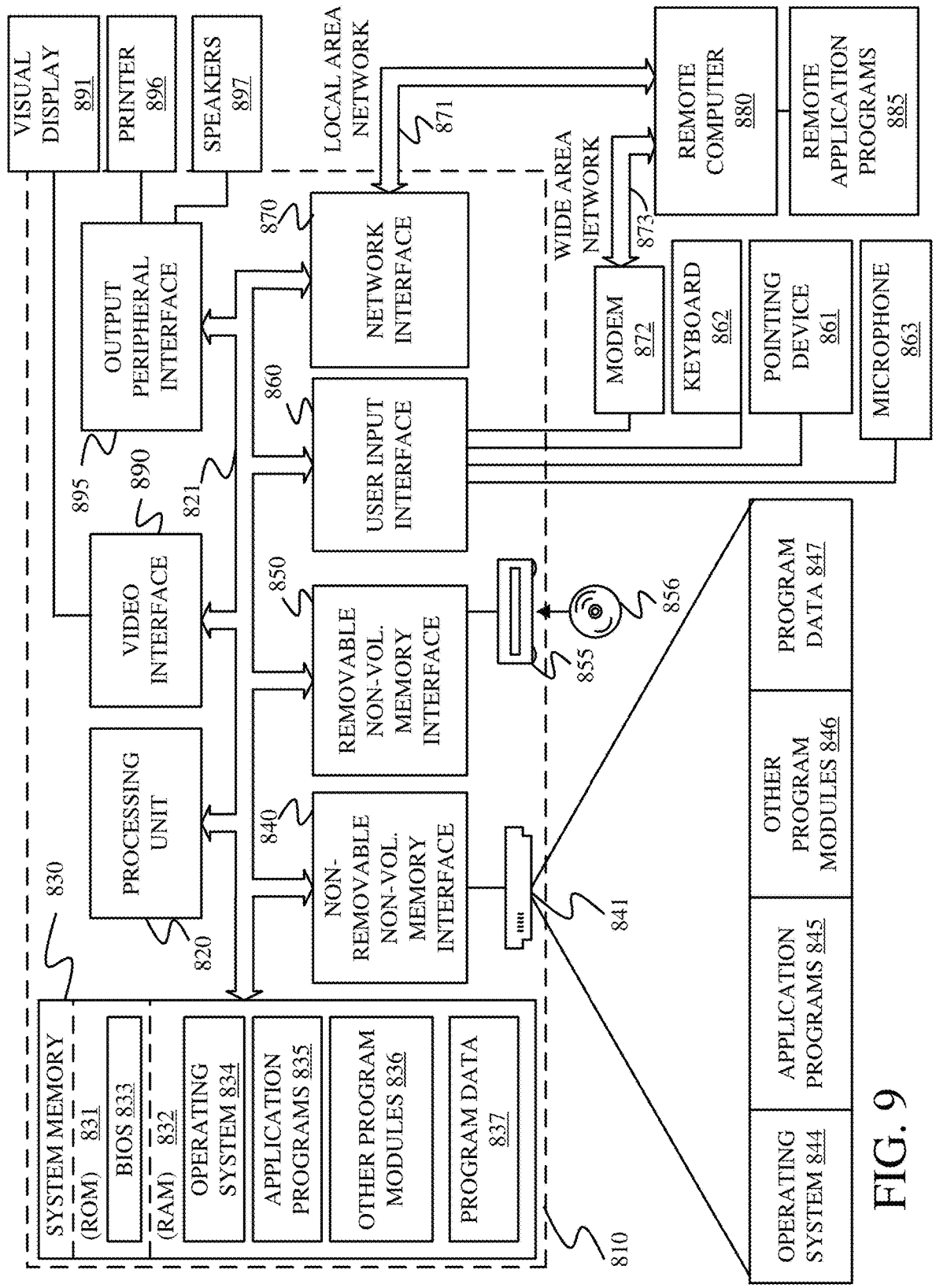
FIG. 9 is a block diagram showing one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, track ball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
    input area-to-display screen mapping logic that identifies
        a display size of a focus area input mechanism, and a
        location on a display screen where the focus area input
        mechanism is to be displayed on the display screen, the display size of the focus area input mechanism being smaller than a size of the display screen;

focus area generator logic that generates a representation of the focus area input mechanism and outputs the representation for display at the location on the display screen;

gesture processing logic that receives a touch event based on a touch input on a touch sensitive surface of a touch sensing device and that performs an operation, corresponding to the touch event, to modify content on a content canvas on which the focus area input mechanism is displayed on the display screen; and a hover processing system that generates a hover output representing a visual display element that performs a hover movement in the focus area input mechanism, displayed on the display screen, in a direction corresponding to movement of a touch input on the touch sensitive surface of the touch sensing device.

Example 2 is the computing system of any or all previous examples wherein the hover output represents the visual display element moving in the focus area input mechanism, without performing another visible operation on the content in the content canvas on which the focus area input mechanism is displayed.

Example 3 is the computing system of any or all previous examples wherein the hover processing system comprises:

position identifier logic configured to identify a first position on the focus area input mechanism to display the visual display element based on a position of a first touch input on the touch sensitive surface, the hover processing system generating the hover output to display the visual indicia at the first location.

Example 4 is the computing system of any or all previous examples wherein the hover processing system comprises:

navigator logic configured to generate the hover output to display the visual indicia moving within the focus area input mechanism from the first location to subsequent locations based on the movement of the touch input on the touch sensitive surface.

Example 5 is the computing system of any or all previous examples wherein the hover processing system comprises:

a hover mode enter detector configured to detect a hover mode enter user input and generate a hover mode enter signal, the hover mode processing system generating the hover output in response to the hover mode enter signal.

Example 6 is the computing system of any or all previous examples wherein the hover processing system comprises:

a hover mode exit detector configured to detect a hover mode exit user input and generate a hover mode exit signal.

Example 7 is the computing system of any or all previous examples wherein the hover processing system comprises:

mode exit logic configured to control a behavior of the visual indicia in response to the hover mode exit signal to identify an area on the focus area input mechanism at which content on the content canvas will be modified based on a next subsequent touch input on the touch sensitive surface.

Example 8 is the computing system of any or all previous examples wherein the mode exit logic is configured to control the hover output to represent the visual indicia shrinking in size based on the hover mode exit signal.

Example 9 is the computing system of any or all previous examples wherein the hover mode exit detector is configured to detect, as the hover mode exit user input, a pause, of a predetermined length, in the movement of the touch input on the touch sensitive surface.

Example 10 is the computing system of any or all previous examples wherein the mode exit logic is configured to control the hover output to represent the visual indicia disappearing at a location on the focus area input mechanism corresponding to a position on the touch sensitive surface where the movement of the touch input paused.

Example 11 is a computer implemented method, comprising:

identifying a display size of a focus area input mechanism, and a location on a display screen where the focus area input mechanism is to be displayed on the display screen, the display size of the focus area input mechanism being smaller than a size of the display screen;

generating a representation of the focus area input mechanism;

outputting the representation for display at the location on the display screen;

receiving a touch event based on a touch input on a touch sensitive surface of a touch sensing device;

performing an operation, corresponding to the touch event, to modify content on a content canvas on which the focus area input mechanism is displayed on the display screen;

receiving a hover mode user input; and generating, in response to the hover mode user input, a hover output representing a visual display element that performs a hover movement in the focus area input mechanism, displayed on the display screen, in a direction corresponding to movement of a touch input on the touch sensitive surface of the touch sensing device.

Example 12 is the computer implemented method of any or all previous examples wherein generating the hover output comprises generating a representation of the visual display element moving in the focus area input mechanism, without performing another visible operation on the content in the content canvas on which the focus area input mechanism is displayed.

Example 13 is the computer implemented method of any or all previous examples wherein generating the hover output comprises:

identifying a first position on the focus area input mechanism to display the visual display element based on a position of a first touch input on the touch sensitive surface; and generating the hover output to display the visual indicia at the first location.

Example 14 is the computer implemented method of any or all previous examples wherein generating the hover output comprises:

generating the hover output to display the visual indicia moving within the focus area input mechanism from the first location to subsequent locations based on the movement of the touch input on the touch sensitive surface.

Example 15 is the computer implemented method of any or all previous examples wherein receiving a hover mode user input comprises:

detecting a hover mode enter user input; and generating a hover mode enter signal.

Example 16 is the computer implemented method of any or all previous examples wherein generating the hover output comprises:

detecting a hover mode exit user input and generate a hover mode exit signal; and controlling a behavior of the visual indicia in response to the hover mode exit signal to identify an area on the focus area input mechanism at which content on the content canvas will be modified based on a next subsequent touch input on the touch sensitive surface.

Example 17 is the computer implemented method of any or all previous examples wherein controlling a behavior of the visual indicia in response to the hover mode exit signal comprises:

controlling the hover output to represent the visual indicia shrinking in size based on the hover mode exit signal.

Example 18 is the computer implemented method of any or all previous examples wherein detecting a hover mode exit user input comprises:

detecting, as the hover mode exit user input, a pause, of a predetermined length, in the movement of the touch input on the touch sensitive surface.

Example 19 is the computer implemented method of any or all previous examples wherein controlling a behavior of the visual indicia in response to the hover mode exit signal comprises:

controlling the hover output to represent the visual indicia disappearing at a location on the focus area input mechanism corresponding to a position on the touch sensitive surface where the movement of the touch input paused.

Example 20 is a computing system, comprising:

input area-to-display screen mapping logic that identifies a display size of a focus area input mechanism, and a location on a display screen where the focus area input mechanism is to be displayed on the display screen, the display size of the focus area input mechanism being smaller than a size of the display screen;

focus area generator logic that generates a representation of the focus area input mechanism and outputs the representation for display at the location on the display screen;

gesture processing logic that receives a touch event based on a touch input on a touch sensitive surface of a touch sensing device and that performs an operation, corresponding to the touch event, to modify content on a content canvas on which the focus area input mechanism is displayed on the display screen; and a hover processing system that generates a hover output representing a visual display element that performs a hover movement in the focus area input mechanism, displayed on the display screen, emulating a non-content modifying movement of a touch input on the touch sensitive surface of the touch sensing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

input area-to-display screen mapping logic that identifies a display size of a focus area input mechanism, and a location on a display screen where the focus area input mechanism is to be displayed on the display screen, the display size of the focus area input mechanism being smaller than a size of the display screen;

focus area generator logic that generates a representation of the focus area input mechanism and outputs the representation for display at the location on the display screen;

gesture processing logic that receives a touch event based on a touch input on a touch sensitive surface of a touch sensing device and that performs an operation, corresponding to the touch event, to modify content on a content canvas on which the focus area input mechanism is displayed on the display screen; and a hover processing system that generates a hover output representing a visual display element that performs a hover movement in the focus area input mechanism, displayed on the display screen, in a direction corresponding to movement of a touch input on the touch sensitive surface of the touch sensing device.

2. The computing system of claim 1 wherein the hover output represents the visual display element moving in the focus area input mechanism, without performing another visible operation on the content in the content canvas on which the focus area input mechanism is displayed.

3. The computing system of claim 2 wherein the hover processing system comprises:

position identifier logic configured to identify a first position on the focus area input mechanism to display the visual display element based on a position of a first touch input on the touch sensitive surface, the hover processing system generating the hover output to display the visual indicia at the first location.

4. The computing system of claim 3 wherein the hover processing system comprises:

navigator logic configured to generate the hover output to display the visual indicia moving within the focus area input mechanism from the first location to subsequent locations based on the movement of the touch input on the touch sensitive surface.

5. The computing system of claim 3 wherein the hover processing system comprises:

a hover mode enter detector configured to detect a hover mode enter user input and generate a hover mode enter signal, the hover mode processing system generating the hover output in response to the hover mode enter signal.

6. The computing system of claim 5 wherein the hover processing system comprises:

a hover mode exit detector configured to detect a hover mode exit user input and generate a hover mode exit signal.

7. The computing system of claim 6 wherein the hover processing system comprises:

mode exit logic configured to control a behavior of the visual indicia in response to the hover mode exit signal to identify an area on the focus area input mechanism at which content on the content canvas will be modified based on a next subsequent touch input on the touch sensitive surface.

8. The computing system of claim 7 wherein the mode exit logic is configured to control the hover output to represent the visual indicia shrinking in size based on the hover mode exit signal.

9. The computing system of claim 8 wherein the hover mode exit detector is configured to detect, as the hover mode exit user input, a pause, of a predetermined length, in the movement of the touch input on the touch sensitive surface.

10. The computing system of claim 9 wherein the mode exit logic is configured to control the hover output to represent the visual indicia disappearing at a location on the focus area input mechanism corresponding to a position on the touch sensitive surface where the movement of the touch input paused.

11. A computer implemented method, comprising:
identifying a display size of a focus area input mechanism, and a location on a display screen where the focus area input mechanism is to be displayed on the display screen, the display size of the focus area input mechanism being smaller than a size of the display screen;
generating a representation of the focus area input mechanism;
outputting the representation for display at the location on the display screen;
receiving a touch event based on a touch input on a touch sensitive surface of a touch sensing device;
performing an operation, corresponding to the touch event, to modify content on a content canvas on which the focus area input mechanism is displayed on the display screen;
receiving a hover mode user input; and
generating, in response to the hover mode user input, a hover output representing a visual display element that performs a hover movement in the focus area input mechanism, displayed on the display screen, in a direction corresponding to movement of a touch input on the touch sensitive surface of the touch sensing device.

12. The computer implemented method of claim 11 wherein generating the hover output comprises generating a representation of the visual display element moving in the focus area input mechanism, without performing another visible operation on the content in the content canvas on which the focus area input mechanism is displayed.

13. The computer implemented method of claim 12 wherein generating the hover output comprises:
identifying a first position on the focus area input mechanism to display the visual display element based on a position of a first touch input on the touch sensitive surface; and
generating the hover output to display the visual indicia at the first location.

14. The computer implemented method of claim 13 wherein generating the hover output comprises:
generating the hover output to display the visual indicia moving within the focus area input mechanism from the first location to subsequent locations based on the movement of the touch input on the touch sensitive surface.

15. The computer implemented method of claim 13 wherein receiving a hover mode user input comprises:
detecting a hover mode enter user input; and
generating a hover mode enter signal.

16. The computer implemented method of claim 15 wherein generating the hover output comprises:
detecting a hover mode exit user input and generate a hover mode exit signal; and
controlling a behavior of the visual indicia in response to the hover mode exit signal to identify an area on the focus area input mechanism at which content on the content canvas will be modified based on a next subsequent touch input on the touch sensitive surface.

17. The computer implemented method of claim 16 wherein controlling a behavior of the visual indicia in response to the hover mode exit signal comprises:
controlling the hover output to represent the visual indicia shrinking in size based on the hover mode exit signal.

18. The computer implemented method of claim 17 wherein detecting a hover mode exit user input comprises:
detecting, as the hover mode exit user input, a pause, of a predetermined length, in the movement of the touch input on the touch sensitive surface.

19. The computer implemented method of claim 18 wherein controlling a behavior of the visual indicia in response to the hover mode exit signal comprises:
controlling the hover output to represent the visual indicia disappearing at a location on the focus area input mechanism corresponding to a position on the touch sensitive surface where the movement of the touch input paused.

20. A computing system, comprising:
input area-to-display screen mapping logic that identifies a display size of a focus area input mechanism, and a location on a display screen where the focus area input mechanism is to be displayed on the display screen, the display size of the focus area input mechanism being smaller than a size of the display screen;
focus area generator logic that generates a representation of the focus area input mechanism and outputs the representation for display at the location on the display screen;
gesture processing logic that receives a touch event based on a touch input on a touch sensitive surface of a touch sensing device and that performs an operation, corresponding to the touch event, to modify content on a content canvas on which the focus area input mechanism is displayed on the display screen; and
a hover processing system that generates a hover output representing a visual display element that performs a hover movement in the focus area input mechanism, displayed on the display screen, emulating a non-content modifying movement of a touch input on the touch sensitive surface of the touch sensing device.

* * * * *